(12) United States Patent
Flixeder et al.

(10) Patent No.: US 12,388,338 B2
(45) Date of Patent: Aug. 12, 2025

(54) TRANSPORT DEVICE

(71) Applicant: B&R Industrial Automation GmbH, Eggelsberg (AT)

(72) Inventors: Stefan Flixeder, Eggelsberg (AT); Michael Hauer, Eggelsberg (AT); Martin Haudum, Eggelsberg (AT)

(73) Assignee: B&R Industrial Automation GmbH, Eggelsberg (AT)

( * ) Notice: Subject to any disclaimer, the term of this patent is extended or adjusted under 35 U.S.C. 154(b) by 507 days.

(21) Appl. No.: 17/780,425

(22) PCT Filed: Nov. 25, 2020

(86) PCT No.: PCT/EP2020/083290
§ 371 (c)(1),
(2) Date: May 26, 2022

(87) PCT Pub. No.: WO2021/105165
PCT Pub. Date: Jun. 3, 2021

(65) Prior Publication Data
US 2023/0026030 A1    Jan. 26, 2023

(30) Foreign Application Priority Data

Nov. 27, 2019  (AT) .............................. A 51034/2019

(51) Int. Cl.
*H02P 25/064* (2016.01)
*H02K 41/03* (2006.01)

(52) U.S. Cl.
CPC ......... *H02K 41/031* (2013.01); *H02P 25/064* (2016.02); *H02K 2201/18* (2013.01)

(58) Field of Classification Search
CPC ........ H02P 25/064; H02P 25/06; H02P 6/006; H02P 25/066; H02P 6/16; H02P 25/024;
(Continued)

(56) References Cited

U.S. PATENT DOCUMENTS

| | | | |
|---|---|---|---|
| 9,202,719 B2 | 12/2015 | Lu et al. | |
| 9,828,192 B2 | 11/2017 | Baechle et al. | |
| 9,878,813 B2 | 1/2018 | Eberhardt et al. | |
| 2016/0380562 A1* | 12/2016 | Weber .................. | B60L 13/003 310/12.11 |

(Continued)

FOREIGN PATENT DOCUMENTS

| | | |
|---|---|---|
| CN | 101610054 A | 12/2009 |
| CN | 108964404 A | 12/2018 |
| WO | 2013112759 A1 | 8/2013 |

OTHER PUBLICATIONS

Jansen J W et al., "Magnetically Levitated Planar Actuator With Moving Magnets"; IEEE Transactions On Industry Applications, vol. 44, No. 4, Jul./Aug. 2008, p. 1108-1115, DOI: 10.1109/TIA.2008.926065.

(Continued)

*Primary Examiner* — Kawing Chan
*Assistant Examiner* — Charles S Laughlin
(74) *Attorney, Agent, or Firm* — Dykema Gossett PLLC

(57) ABSTRACT

Various aspects of the present disclosure are directed to a transport device in the form of a planar motor. In one example embodiment, the transport device includes at least one transport segment forming a transport plane, at least one transport unit movable in the transport plane in at least two-dimensions associated with two main movement directions, and first and second coil groups. The first coil group defines the first main movement direction and has drive coils arranged on the at least one transport segment, and the second coil group defines the second main movement direction and has drive coils arranged on the at least one transport segment. The transport device further includes drive magnets arranged on the at least one transport unit and a control unit. The control unit controls the drive coils of the first coil group and the drive coils of the second coil group.

19 Claims, 11 Drawing Sheets

(58) Field of Classification Search
CPC .......... H02P 31/00; H02P 25/032; H02P 8/00;
H02P 23/14; H02P 1/00; H02P 1/16;
H02P 21/0017; H02P 21/0025; H02P
21/04; H02P 21/141; H02P 21/16; H02P
21/18; H02P 21/22; H02P 21/32; H02P
2207/05; H02P 2209/07; H02P 23/0031;
H02P 25/026; H02P 25/034; H02P 25/22;
H02P 6/14; H02P 6/15; H02P 6/17; H02P
21/0003; H02P 21/12; H02P 2101/45;
H02P 23/009; H02P 23/02; H02P 23/04;
H02P 23/24; H02P 25/062; H02P 25/089;
H02P 25/092; H02P 25/16; H02P 3/18;
H02P 5/74; H02P 6/24
See application file for complete search history.

(56) References Cited

U.S. PATENT DOCUMENTS

| | | | |
|---|---|---|---|
| 2017/0179806 A1 | 6/2017 | Lu | |
| 2018/0212505 A1 | 7/2018 | Ding | |
| 2018/0323732 A1* | 11/2018 | Weber | H02P 21/12 |
| 2019/0348898 A1 | 11/2019 | Frangen | |
| 2020/0180872 A1* | 6/2020 | Davidson | B65G 54/02 |
| 2020/0244149 A1* | 7/2020 | Selnes | H02K 15/02 |

OTHER PUBLICATIONS

J.M.M., Rovers, et. al., 2013. Design and measurements of the Double Layer Planar Motor. In: International Electric Machines & Drives Conference. Chicago, May 12-15, 2013. IEEE.

* cited by examiner

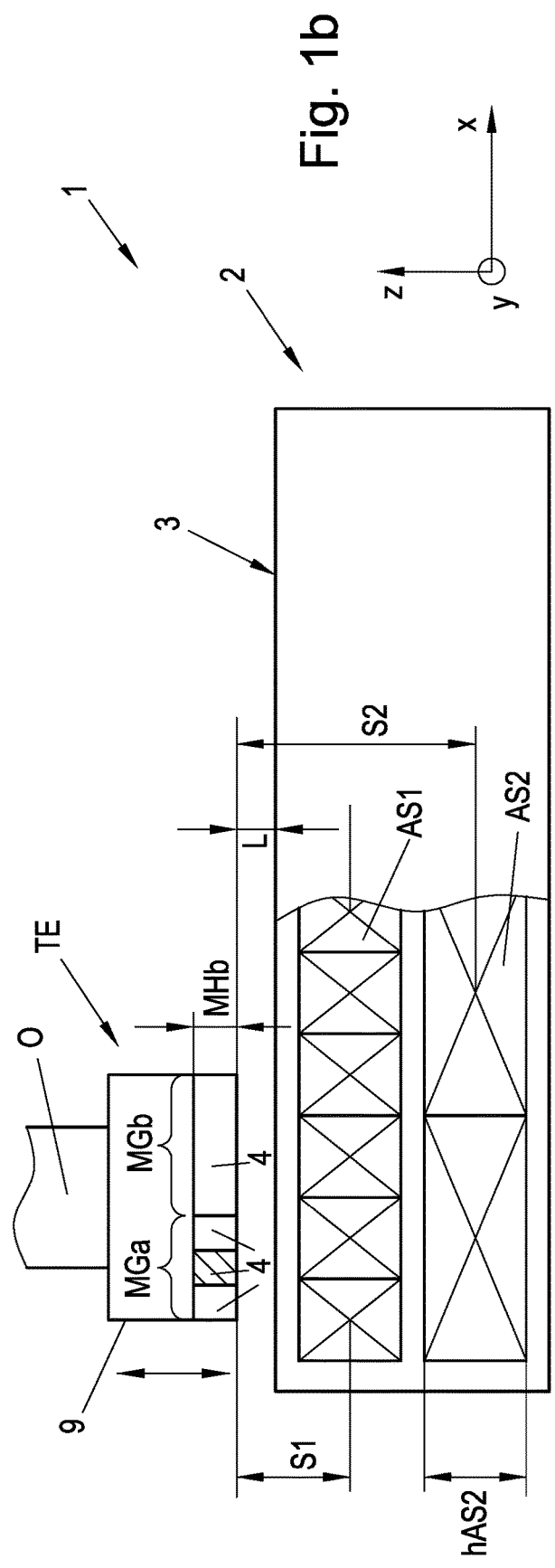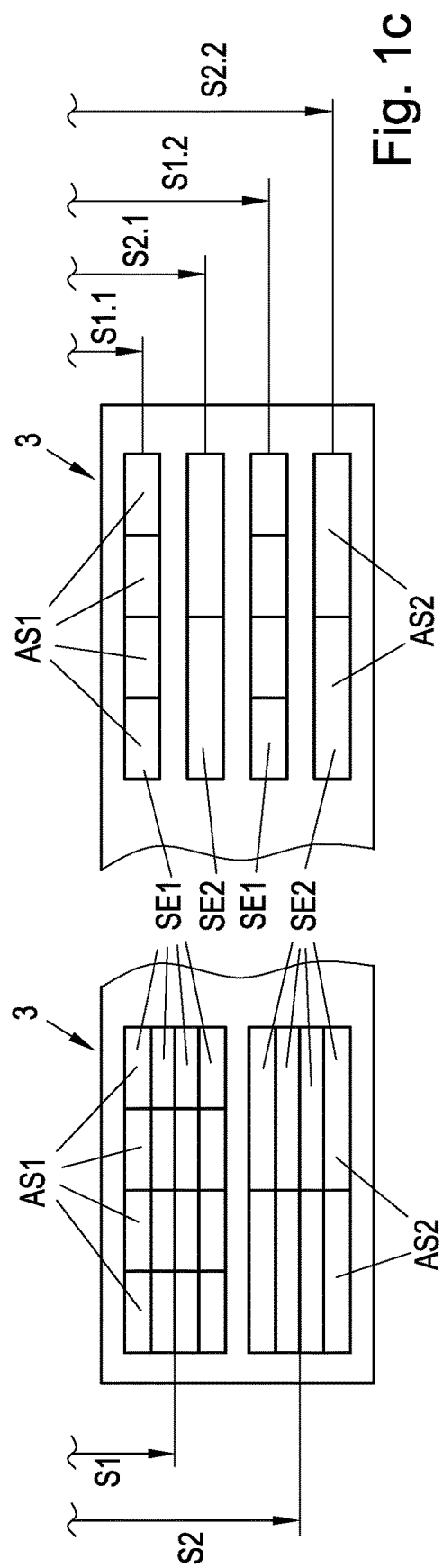

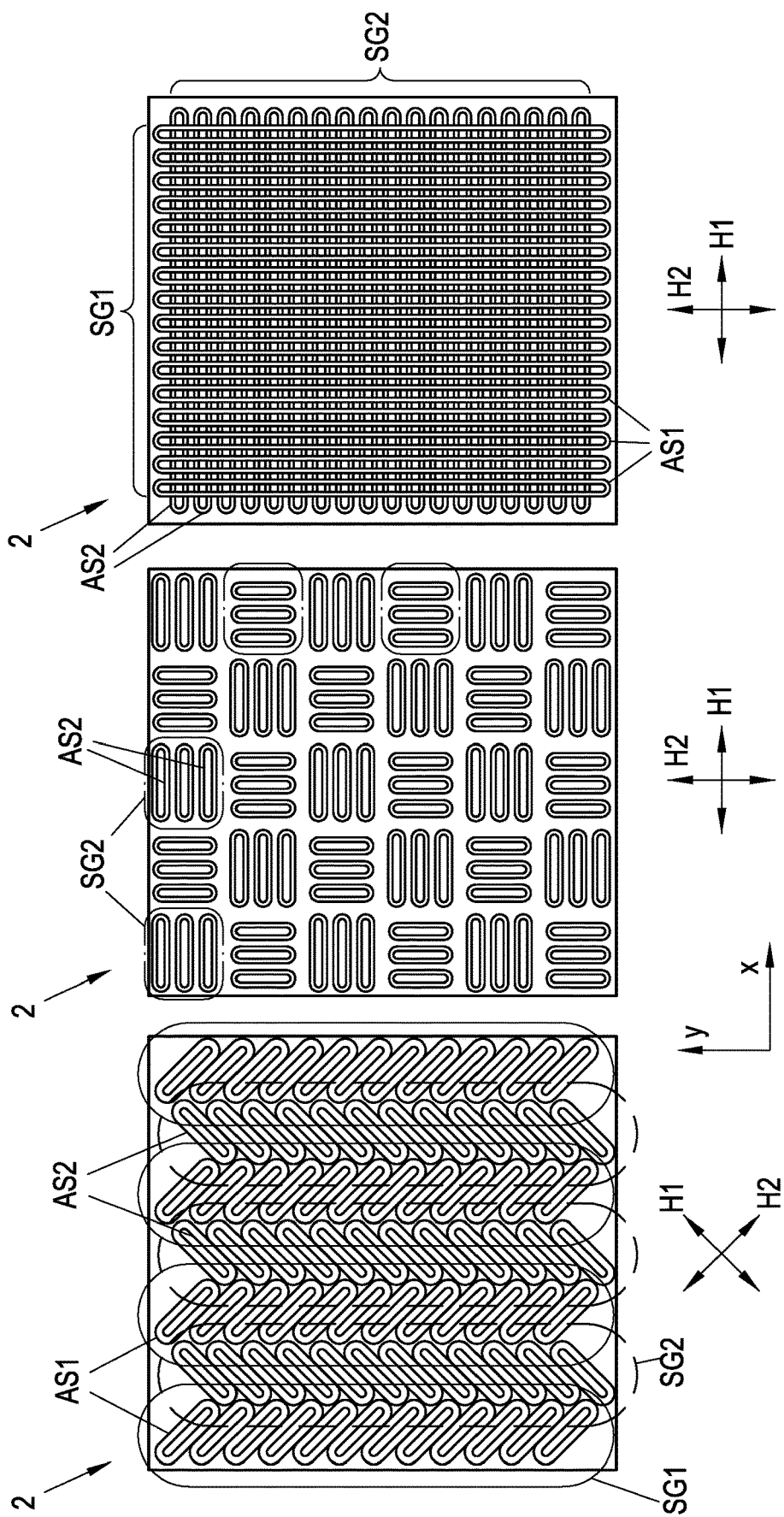

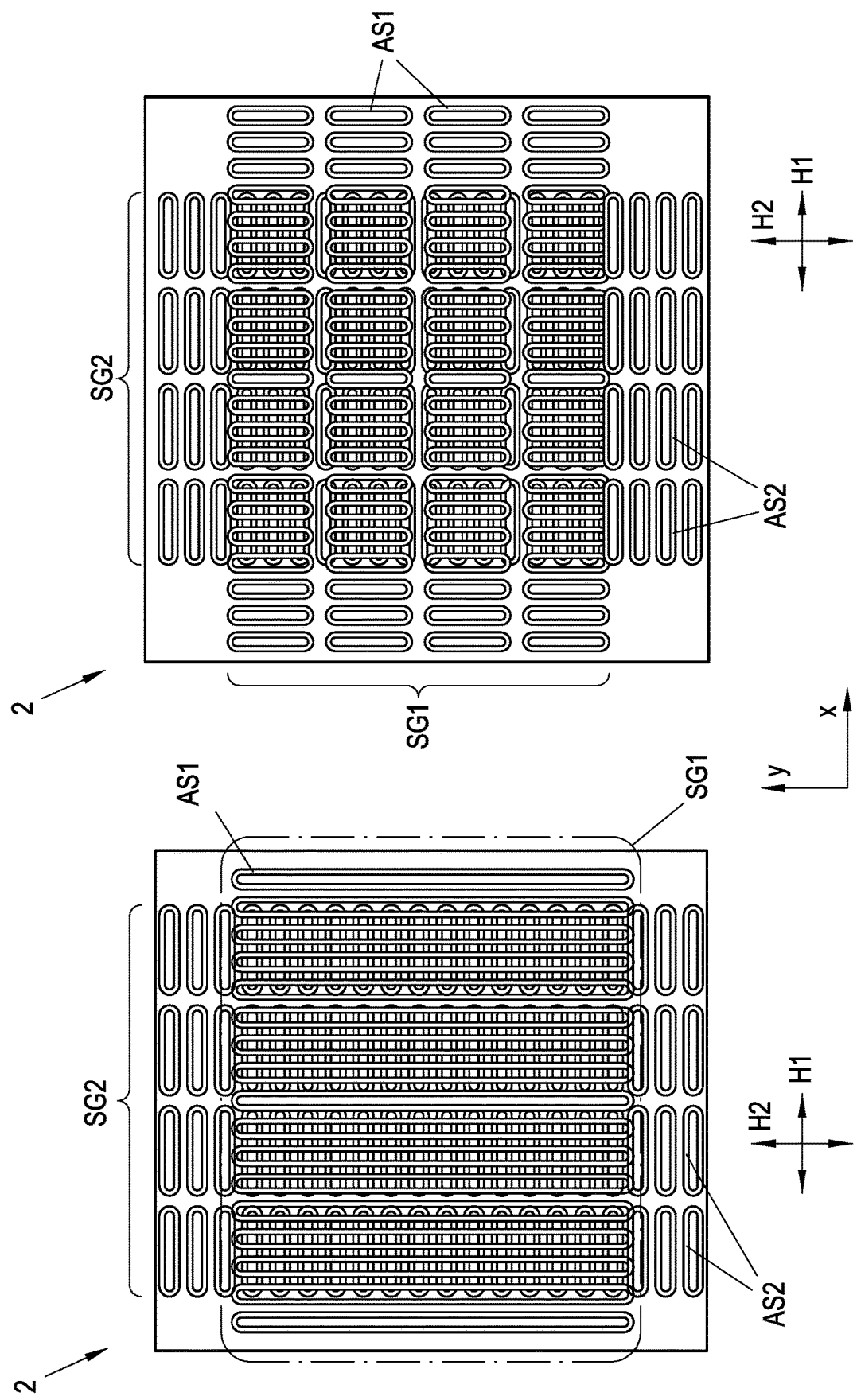

TRANSPORT DEVICE

CROSS-REFERENCE TO RELATED APPLICATIONS

This application is a national stage filing based upon International PCT Application No. PCT/EP2020/083290, filed 25 Nov. 2020, which claims the benefit of priority to Austria application No. A 51034/2019, filed 27 Nov. 2019.

BACKGROUND

The invention relates to a transport device in the form of a planar motor having at least one transport segment forming a transport plane and having at least one transport unit movable in the transport plane at least two-dimensionally in two main movement directions, wherein a first coil group which defines the first main movement direction and has a plurality of drive coils is arranged on the transport segment, and a second coil group which defines the second main movement direction and has a plurality of drive coils is arranged on the transport segment, and a plurality of drive magnets is arranged on the transport unit, wherein the drive coils of the first coil group are controllable by a control unit in order to interact electromagnetically with at least some of the drive magnets of the transport unit for moving the transport unit in the first main movement direction, and the drive coils of the second coil group are controllable by the control unit in order to interact electromagnetically with at least some of the drive magnets of the transport unit for moving the transport unit in the second main movement direction, wherein the transport unit is movable in the two main movement directions with a different degree of efficiency and/or a different maximum force and/or a different accuracy, in that the drive coils of the first and second coil group have different coil properties influencing the magnetic field and/or the drive magnets of the transport unit interacting with the drive coils of the first coil group have different magnetic properties influencing the magnetic field than the drive magnets interacting with the drive coils of the second coil group. The invention also relates to a method for operating such a transport device.

Planar motors are well known in the prior art. For example, U.S. Pat. No. 9,202,719 B2 discloses the basic design and mode of operation of such a planar motor. A planar motor essentially has a stator forming a transport plane in which one or more transport units can be moved at least two-dimensionally. The stator is usually made up of one or more transport segments. In order to move the transport units in the transport plane, a driving force acting on the transport unit is generated by a magnetic field of the stator (of the transport segment(s)) interacting with a magnetic field of the transport unit. In order to effect a movement of the transport unit in a specific movement direction, at least one of the magnetic fields, i.e., that of the stator and/or that of the transport unit, must be temporally changeable in order to follow the movement of the transport unit. In most cases, however, only one magnetic field, usually that on the stator, is temporally changeable and the respective other magnetic field (that on the transport unit) is usually constant, i.e., it is not temporally changeable.

Temporally changeable magnetic fields can be generated, for example, by coils (electromagnets) that can be arranged both on the transport unit and on the stator, in particular on the transport segment. The coils are frequently also called drive coils. Temporally unchanging, i.e., constant, magnetic fields are typically generated by means of permanent magnets. These components are frequently called drive magnets. Depending on the embodiment of the planar motor, they can also be arranged both on the transport unit and on the transport segment. Due to the simpler control, the drive coils are often arranged on the transport segment of the planar motor and the drive magnets are arranged on the transport unit.

The drive coils are usually controlled by a control unit in order to generate a moving magnetic field in the desired movement direction. The drive magnets, which interact with the moving magnetic field, are distributed at least two-dimensionally on the transport unit, so that a driving and levitation force can be generated on the transport unit. Due to the levitation force, the transport unit can be held in a constant position, e.g., an air gap can be created or adjusted and maintained between the transport unit and the transport segments. The additionally acting driving force can be used to move the transport unit in the desired movement direction and tilting forces or tilting moments can be generated. In order to make possible the two-dimensional movement of the transport unit, which is characteristic of the planar motor, a two-dimensional interaction of the magnetic fields of the transport segments and the transport units is required, wherein one of the two magnetic fields must be temporally changeable in at least two dimensions or both magnetic fields must be temporally changeable in at least one dimension (complementary to the respective other dimension). The drive coils and the drive magnets are advantageously arranged such that, in addition to a one-dimensional movement along the axes spanned by the transport plane, more complex two-dimensional movements of the transport unit in the transport plane are also possible.

A planar motor can be used, for example, as a transport device in a production process, wherein very flexible transport processes with complex movement profiles can be realized. In EP 3 172 156 B1 and EP 3 172 134 B1, for example, such applications of a planar motor as a transport device are shown.

The stators of such planar motors can have different arrangements of drive coils, and the arrangement of the drive magnets on the transport units can also be very different. For example, U.S. Pat. No. 9,202,719 B2 discloses a planar motor with a multi-layer structure of the stator with a plurality of coil planes lying one above the other. The drive coils in adjacent coil planes are orthogonal to one another in order to form two main movement directions in which the transport units are movable. On average, the coil planes are therefore at different distances from the drive magnets of the transport unit. This results in different efficiencies of the planar motor in the two main movement directions. In order to compensate for this fact, it is proposed for generating the driving force that a higher coil current is applied to the drive coils of a coil plane further away from the drive magnets of the transport unit than is applied to the drive coils of a closer coil plane.

In the publication J. M. M., Rovers, et. al, 2013. Design and measurements of the Double Layer Planar Motor. In: International Electric Machines & Drives Conference. Chicago, May 12-15, 2013. IEEE. a planar motor with a layered arrangement of two coil planes is disclosed. In order to compensate for the different efficiencies that result from the different distances from the magnets of the transport unit, it is proposed that drive coils of different heights are used for the two coil planes.

Therefore, it is an object of the invention, to provide a transport device in the form of a planar motor and a method for operating a transport device in the form of a planar motor, which allow for a more efficient operation of the transport device.

SUMMARY OF THE INVENTION

According to the invention, the problem is solved in that the at least one transport segment is oriented relative to a movement path which is predefined for the transport unit and runs between a defined starting point and a defined end point such that the movement path lies on the transport plane in such a manner that a first movement path proportion of the first main movement direction at a movement path length of the movement path is greater than or equal to a second movement path proportion of the second main movement direction at the movement path length. This ensures that the movement of the transport unit takes place predominantly in the first main movement direction, resulting in a more efficient operation of the transport device.

Advantageous configurations of the transport device are specified in dependent claims 2-12.

Furthermore, the problem is solved by a method according to claim 13. Advantageous developments of the method are specified in dependent claims 14-19.

BRIEF DESCRIPTION OF THE DRAWINGS

In the following, the present invention is described in greater detail with reference to FIG. 1a to 10 which, by way of example, show schematic and non-limiting advantageous embodiments of the invention. In the drawings.

FIG. 1b+1c are each side views of a transport device in the form of a planar motor;

FIG. 2a-2e show different options for arranging drive coils on a transport segment;

DETAILED DESCRIPTION

Figure 1A:
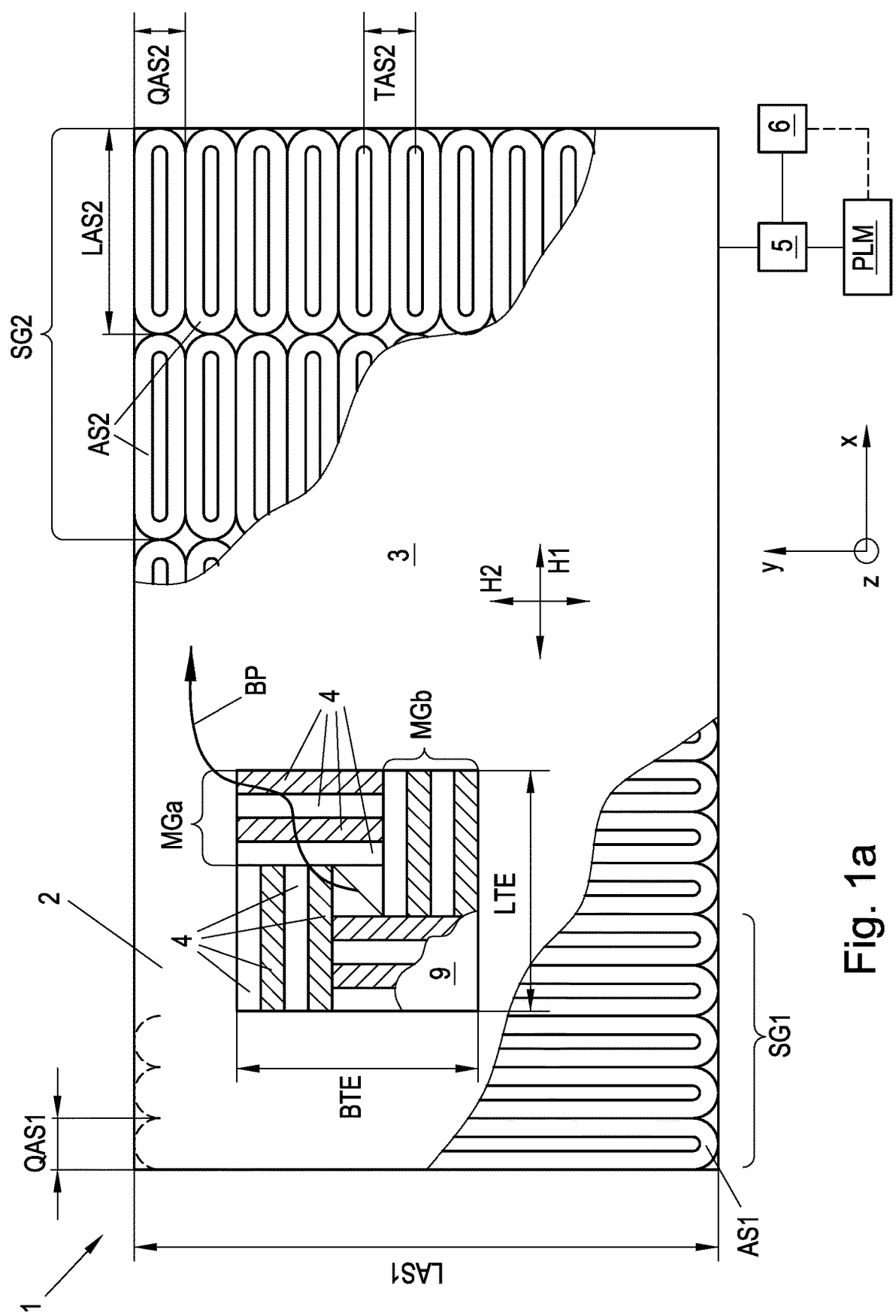
FIG. 1a is a plan view of a transport device in the form of a planar motor.

FIG. 1a-1c show a simplified exemplary configuration of a transport device 1 in the form of a planar motor. FIG. 1a is a plan view of the transport device 1 and FIG. 1b+1c are side views of the transport device 1. The transport device 1 has at least one transport segment 2 as a stator, which forms a transport plane 3 and at least one transport unit TE, which is movable in the transport plane 3 at least two-dimensionally in two main movement directions H1, H2. Within the scope of the invention, the transport plane 3 refers to the planar surface of the transport segment 2, which is determined by the size and shape of the transport segment 2. For the sake of simplicity, only one transport segment 2 is shown in FIG. 1a, but a multiplicity of transport segments 2 (also different ones) could naturally also be lined up in order to form a larger transport plane 3, as shown, e.g., in FIG. 5 and FIG. 6. As a result, the transport device 1 can have a modular design and transport planes 3 of different shapes and surfaces can be realized. Of course, this modular design is only optional and it is also possible to provide only a single transport segment 2 in the form of a single assembly. In the transport plane 3 of the transport segment 2, a plurality of transport units TE, including different transport units, can naturally also be moved simultaneously and independently of one another.

A first coil group SG1 with a plurality of drive coils AS1, which defines the first main movement direction H1, and a second coil group SG2 with a plurality of drive coils AS2, which defines the second main movement direction H2, are arranged on the transport segment 2. The drive coils AS1 of the first coil group SG1 are arranged one behind the other in a specific direction, in this case in the X-direction, in order to form the first main movement direction H1 for the movement of the transport unit TE, which in this case extends along the X-axis. The drive coils AS2 of the second coil group SG2 are arranged one behind the other in a specific direction, in this case the Y-direction, in order to form a second main movement direction H2 for the transport unit TE, which in this case extends along the Y-axis. The drive coils AS1, AS2 of the first and second coil groups SG1, SG2, as shown in FIG. 1a, are preferably arranged relative to one another such that the two main movement directions H1, H2 are perpendicular to one another. Of course, another relative arrangement of the main movement directions H1, H2 would also be conceivable, for example, an angle between the main movement directions H1, H2 that deviates from a right angle.

The drive coils AS1 of the first coil group SG1 and the drive coils AS2 of the second coil group SG2 are in this case each designed as elongated, conventionally wound coils. The drive coils AS1 of the first coil group SG1 each have a longitudinal extension LAS1 in the Y-direction and, relative thereto, a smaller transverse extension QAS1 in the X-direction and are arranged one behind the other in the direction of their transverse extension QAS1, in this case in the X-direction. The transverse extension QASi of a drive coil ASi typically depends on the pole pitch Ti of the drive magnets 4 of the magnet group MGi interacting therewith and/or the winding scheme of the drive coils ASi, i.e., whether it is, for example, a concentrated winding (single-tooth winding) or a distributed winding. The winding schemes are known in the prior art. The direction in which the drive coils AS1 of the first coil group SG1 are arranged one behind the other thus defines the first main movement direction H1 for the movement of the transport unit TE. The drive coils AS1 of the first coil group SG1 are designed as so-called "long coils." This means that its longitudinal extension LAS1 is greater than the extension of the transport unit TE in the respective direction (in this case the Y-direction), in this case, e.g., greater than a transport unit width BTE of the transport unit TE. In the example shown, the longitudinal extension LAS1 is essentially the same size as the extension of the transport segment 2 in the Y-direction. A movement of a transport unit TE in the X-direction, i.e., in the first main movement direction H1, is thus possible at essentially any point in the Y-direction.

The drive coils AS2 of the second coil group SG2 also have a longitudinal extension LAS2, which in this case is shorter than the longitudinal extension LAS1 of the drive coils AS1 of the first coil group SG1. In this case, the longitudinal extension LAS2 of the drive coils AS2 of the second coil group SG2 runs in the X-direction. The drive coils AS2 of the second coil group SG2 also each have a smaller transverse extension QAS2, in this case in the Y-direction, relative to their longitudinal extension LAS2. The transverse extension QAS2 is in this case essentially the same size as the transverse extension QAS1 of the drive coils AS1 of the first coil group SG1, but could also be larger or smaller. The drive coils AS2 of the second coil group SG2 are also arranged one behind the other in the direction of their transverse extension QAS2, in this case in the Y-direction. The direction in which the drive coils AS2 of the second coil group SG2 are arranged one behind the other thus defines the second main movement direction H2 for the movement of the transport unit TE.

The drive coils AS2 of the second coil group SG2 are designed as so-called "short coils." This means that its longitudinal extension LAS2 is smaller than or equal to the extension of the transport unit TE in the respective direction (in this case the X-direction), in this case, for example, the transport unit length LTE of the transport unit TE. In order to still allow for a movement of a transport unit TE in the second main movement H2 in the entire transport plane 3, the drive coils AS2 of the second coil group SG2 are arranged in a plurality of rows next to one another in the X-direction, in this case, e.g., in three rows. However, a reverse arrangement would also be possible, i.e., "long" coils for the second main movement direction H2 and "short" coils for the first main movement direction H1. It would also be possible to use either "long" or "short" coils for both main movement directions H1, H2. For example, it can be advantageous in terms of cost savings if identical drive coils AS1=AS2 are used for both coil groups SG1, SG2.

Of course, the embodiment shown is only to be understood as an example and a person skilled in the art could also provide a different arrangement of the coil groups SG1, SG2 and/or other designs of drive coils. For example, so-called PCB coils could be used in a known manner. PCB stands for "printed circuit board" and means that the coils are integrated directly into a printed circuit board. The two embodiments are known in the prior art and therefore no further detailed description is provided at this point. Another arrangement of the coil groups SG1, SG2 relative to one another and/or to the transport segment 2 would also be conceivable and/or further coil groups SGi with drive coils ASi could also be provided, which form a further main movement direction Hi. However, in the most common case, two differently oriented coil groups SG1, SG2, each with a plurality of drive coils AS1, AS2, are sufficient, wherein each coil group SG1, SG2 defines a main movement direction H1, H2. However, the at least two main movement directions H1, H2 are, as shown, preferably perpendicular to one another, as a result of which the transport segment 2 can be designed in a structurally simpler manner.

For a modular design of a transport plane 3 consisting of a plurality of transport segments 2, it is also advantageous if the transport segments 2 each have a square or rectangular transport plane 3. The transport segments 2 can then be lined up in a simple manner, so that the respective first main movement direction H1 of a transport segment 2 runs parallel or normal to the first main movement direction H1 of the respective adjacent transport segment 2, as shown, for example, in FIG. 6. A transport plane 3 can thus be built up easily and flexibly from a plurality of transport segments 2. It is also not absolutely necessary for adjacent transport segments 2 to be aligned with one another; instead, an offset would also be possible.

With the transport device 1 shown, an essentially unrestricted movement of a transport unit TE in the two main movement directions H1, H2 would be possible, for example, in the transport plane 3 of the transport segment 2. It could be possible that the transport unit TE can only be moved, for example, along the X-axis or only along the Y-axis. The transport unit TE can naturally be moved simultaneously in both main movement directions H1, H2, e.g., with a two-dimensional movement path BP lying in the transport plane 3 with an X-coordinate and a Y-coordinate, as indicated on the transport unit TE in FIG. 1a. With a corresponding structural design of the transport segment 2 and the respective transport unit TE, the other four degrees of freedom can also be used in a known manner at least to a limited extent (translational movement in the vertical direction Z and rotation about the three axes X, Y, Z).

A control unit 5 is also provided in the transport device 1, with which the drive coils AS1, AS2 of the transport segment 2 can be controlled, as indicated in FIG. 1a. The control unit 5 can, e.g., also be connected to, or integrated in, a higher-level system control unit 6. If a plurality of transport segments 2 is provided in the transport device 1, a segment control unit (not shown) can also be provided for each transport segment 2 or a group of transport segments 2, and/or a coil control unit can be provided for each drive coil ASi, which can also be integrated in the control unit 5. The movement path BP of a transport unit TE can be predefined via the control unit 5 and/or the system control unit 6, for example, on the basis of a specific production process of a system in which the transport device 1 can be integrated.

As mentioned above, a plurality of transport units TE can naturally also be moved simultaneously and independently of one another on the transport device 1. The control unit 5 and/or the system control unit 6 then ensures that the movement sequences of the transport units TE are synchronized with one another or coordinated with one another, for example, in order to prevent transport units TE from colliding with one another and/or with transported objects. A control program that realizes the desired movement paths of the individual transport units TE runs on the control unit 5. The control unit 5 or the system control unit 6 can, for example, also be connected to a planning module PLM for planning the movement path BP. The planning module PLM can be, e.g., a computer on which the actually built up transport device 1, in particular the transport plane 3, is implemented virtually, for example.

A plurality of drive magnets 4 are arranged on the at least one transport unit TE, which interact electromagnetically with the drive coils AS1, AS2 of the at least two coil groups SG1, SG2 for moving the transport unit TE. For this purpose, the transport unit TE generally has a main body 9, on the underside of which (facing the transport plane 3) the drive magnets 4 are arranged, as can be seen in FIG. 1b. FIG. 1a shows the main body 9 largely broken away in order to be able to see the arrangement of the drive magnets 4.

In the example shown, two first magnet groups MGa and two second magnet groups MGb are arranged on the transport unit TE. A single first magnet group MGa and a single second magnet group MGb per transport unit TE are essentially sufficient to operate the transport device 1. Of course, more than two first magnet groups MGa and more than two second magnet groups MGb can also be arranged per transport unit TE. An unequal number of first and second magnet groups MGa, MGb would also be conceivable, for example, two first magnet groups MGa and one second magnet group MGb. In the magnet groups MGa, MGb, a plurality of drive magnets 4 of different magnetization directions is provided, which are arranged one behind the other in a specific arrangement direction with a specific pole pitch Ta, Tb. In this case, the arrangement direction of the first magnet groups MGa corresponds to the X-direction, and the arrangement direction of the second magnet groups MGb corresponds to the Y-direction. Analogously to the main movement directions H1, H2, the arrangement directions are thus perpendicular to one another. The arrangement directions of the magnet groups MGa, MGb preferably run as parallel as possible to the main movement directions H1, H2 in order to allow for the most efficient generation of electromagnetic force possible. The example shown is a known 1D arrangement of the drive magnets 4 on the transport unit TE, but an also known 2D arrangement would also be possible, as will be explained in detail with reference to FIG. 4a-4d.

In order to move the transport units TE in the transport plane 3, the first and second drive coils AS1, AS2 can be individually controlled (energized) by the control unit 5. Possibly required power electronics can be arranged in the control unit 5 or on the transport segment 2. An essentially moving magnetic field is generated in the first main movement direction H1 by an appropriately temporally offset activation of the first drive coils AS1. The moving magnetic field in the first main movement direction H1 mainly interacts electromagnetically with the drive magnets 4 of the first magnet group(s) MGa in order to generate the driving force for setting a predefined movement state of the respective transport unit TE in the first main movement direction H1, e.g., an acceleration, a constant speed, or a deceleration to standstill. Analogously, by controlling the second drive coils AS2 in a temporally offset manner, an essentially moving magnetic field is generated in the second main movement direction H2, which mainly interacts electromagnetically with the drive magnets 4 of the second magnet group(s) MGb in order to generate the driving force for moving the transport unit TE in the second main movement direction H2. Depending on the activation of the drive coils AS1, AS2, the moving magnetic fields are superimposed, as a result of which the transport unit TE can be moved in the desired manner along a predefined two-dimensional movement path BP in the transport plane 3.

In addition to the two essentially unlimited translational degrees of freedom in the main movement directions H1, H2 in the transport plane 3, a limited translational movement of a transport unit TE in the normal direction on the transport plane 3 is also possible, in this case in the direction of the Z-axis. Depending on the arrangement and the design of the drive coils AS1, AS2 of the coil groups SG1, SG2 and the first and second magnet groups MGa, MGb interacting therewith, a limited rotation of the transport units TE about the three spatial axes X, Y, Z is also possible.

As mentioned above, adjacent drive magnets 4 of the magnet groups MGa, MGb have different magnetic orientations and are spaced apart from one another in a specific pole pitch Ta, Tb (in this case from the center of one drive magnet 4 to the center of the adjacent drive magnet 4). In general, the magnetic field generated by the magnet group MGi changes its orientation by 180° within the pole pitch Ti. The necessary distance between the drive magnets 4 for generating a magnetic field with the desired pole pitch Ti also depends on the arrangement of the drive magnets 4 within a magnet group MGi, in particular on a gap width of any gap provided between adjacent drive magnets 4, on the magnetization direction of adjacent drive magnets 4 (e.g., 180° opposite or Halbach arrangement), and the magnet width MBi of the drive magnets 4. In the Halbach arrangement, it can be advantageous if, for example, the outermost drive magnets 4 of a magnet group MGi have, for example, half the magnet width MBi of the drive magnets 4 located in between.

This can mean, e.g., that a magnetic north pole and south pole alternate in each case, as indicated in FIG. 1a by the shaded and not shaded drive magnets 4 on the transport unit TE, which corresponds to an arrangement of adjacent drive magnets 4 rotated by 180°. The known Halbach arrangement, in which the magnetization direction of adjacent drive magnets 4 is rotated by 90° to one another, has also proven to be advantageous. In this case, the pole pitch Ta, Tb refers in each case to the distance between two drive magnets 4 adjacent in the arrangement direction and with opposite magnetic orientations (north/south pole). If the drive magnets 4 have the same magnet width MB (in the arrangement direction), if adjacent drive magnets have an orientation direction rotated by 180° and if the drive magnets 4 are directly adjacent to one another (which is usually the case), the pole pitch Ta, Tb corresponds to the respective magnet width MBa, MBb. The pole pitch Ta, Tb and the magnet width MBa, MBb are shown by way of example on the transport unit TE in FIG. 4a and FIG. 4c.

In operation, an air gap L is provided between the transport plane 3 of the transport segment 2 and the drive magnets 4 of the magnet groups MGa, MGb of a transport unit TE, as can be seen in FIG. 1b. Preferably, a preferably magnetically conductive cover layer is also provided on the transport segment 2 in order to shield the underlying drive coils AS1, AS2 from external influences and to form an essentially smooth transport plane 3. In FIG. 1a, the cover layer is shown partially broken away in order to be able to recognize the arrangement of the drive coils AS1, AS2 located underneath. Analogously, a cover layer to cover the drive magnets 4 can naturally also be provided on the transport units TE. The air gap L then extends between the cover layer and the drive magnets 4 of the respective transport unit TE. In order to create and in particular maintain the air gap L, the drive coils AS1, AS2 and the drive magnets 4 act in a known manner during operation not only to generate a driving force (which is required for movement in the main movement directions H1, H2), but also to generate a levitation force FS, in this case in the Z-direction. The levitation force FS also acts when the transport unit TE is at a standstill in order to generate and maintain the air gap L. In addition to the depicted essentially horizontal installation position of the transport segment 2, an inclined installation position in the manner of an inclined plane would naturally also be conceivable. An essentially vertical installation position would also be possible.

Levitation force FS refers to the part of the electromagnetically generated force that acts on the transport unit TE and is opposed to the weight force FG and a force component of any process force FP in the gravitational direction (e.g., weight force of a transported object O and a work process force possibly also acting on the transport unit TE due to a work process in a process station of the transport device 1). The amount of the levitation force FS corresponds essentially to the vectorial sum of the weight force FG and the process force FP (in the gravitational direction), so that a static equilibrium state of the transport unit TE is achieved while maintaining the air gap. Driving force refers to the part of the electromagnetically generated force that leads to a change in the movement state of the transport unit TE (e.g., constant speed, acceleration, deceleration, etc.) or the part that must be applied in addition to the levitation force FS in order to keep the transport unit TE at a standstill in the case of a process force FP not acting in the gravitational direction. In addition to the two-dimensional movement in the transport plane 3, a specific movement of the transport unit TE in the vertical direction is also possible, i.e., normal to the transport plane 3. The air gap L can be increased and decreased to a limited extent by appropriate control of the drive coils AS1, AS2, as a result of which the transport unit TE can be moved in the vertical direction, in this case in the Z-direction, as indicated by the double arrow on the transport unit TE in FIG. 1b. The extension of the available freedom of movement in the vertical direction depends essentially on the structural design of the transport device 1, in particular on the maximum magnetic field that can be generated by the drive coils AS1, AS2 and the drive magnets 4, as well as the mass and load of the transport unit TE. Depending on the size and design of the transport device 1, the available range of movement in the vertical direction can be, for example, in the range from a few mm to several centimeters.

It is also provided that the drive coils AS1, AS2 of the first and second coil groups SG1, SG2 have different coil properties influencing the magnetic field and/or that the drive magnets 4 of the transport unit TE (in this case the first magnet group MGa) predominantly interacting with the drive coils AS1 of the first coil group SG1 have different magnetic properties influencing the magnetic field than the drive magnets 4 (in this case the second magnet group MGb) predominantly interacting with the drive coils AS2 of the second coil group SG2. As a result, the transport unit TE can be moved in the two main movement directions H1, H2 with a different efficiency $\mu H1 \neq \mu H2$ and/or a different maximum force and/or a different accuracy.

Figure 3A:
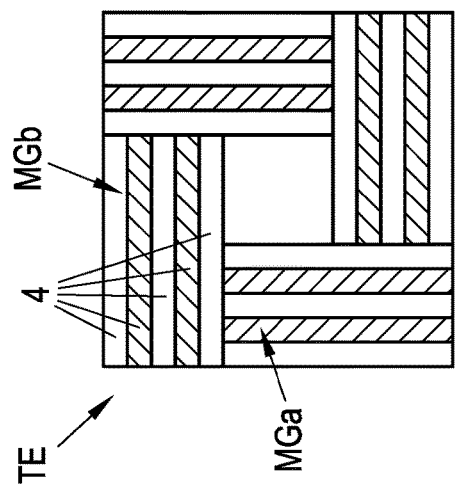
FIG. 3a-3f show different options of a 1D arrangement of drive magnets on a transport unit.
Figure 3B:
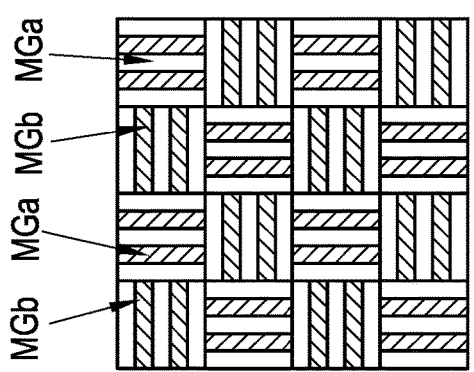
Figure 3C:
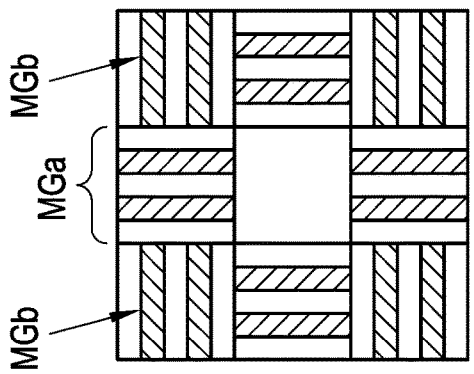
Figure 3D:
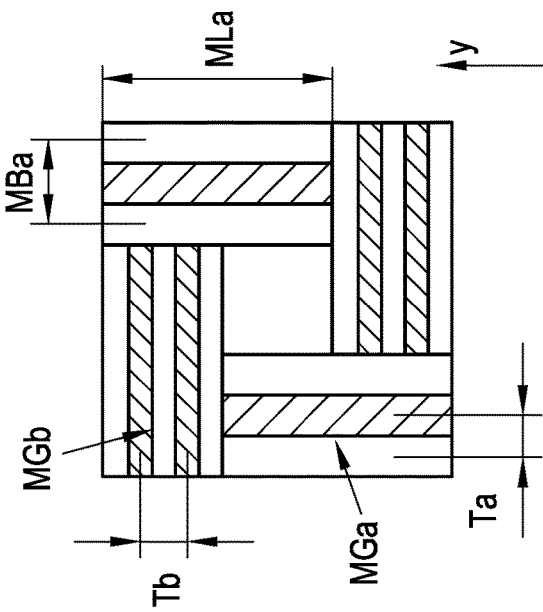
Figure 3E:
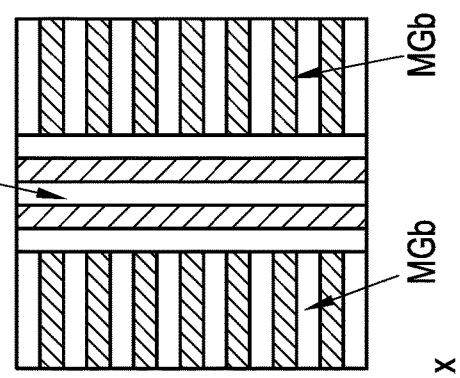
Figure 3F:
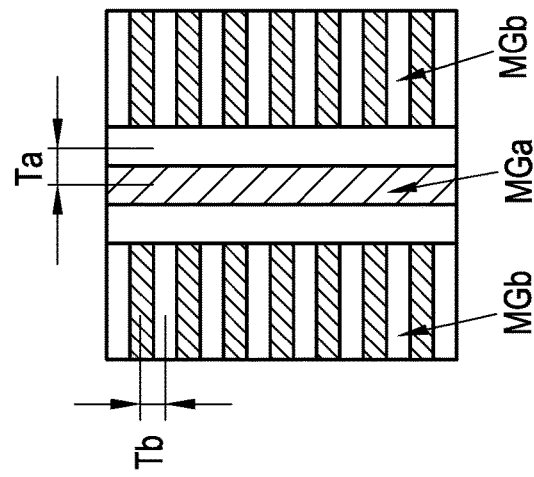
Figure 4A:
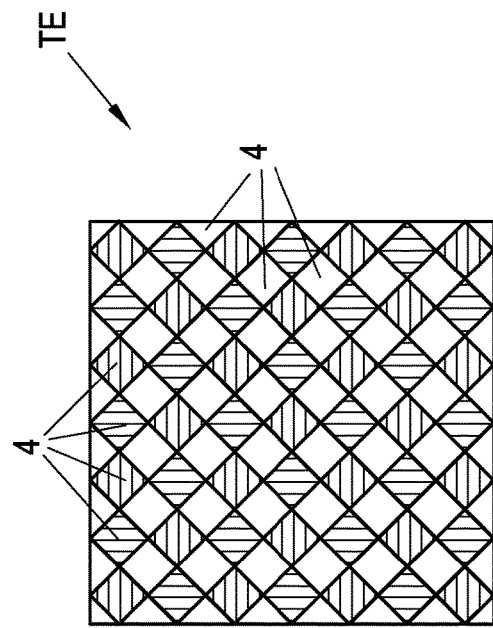
FIG. 4a-4d show different options of a 2D arrangement of drive magnets on a transport unit.
Figure 4B:
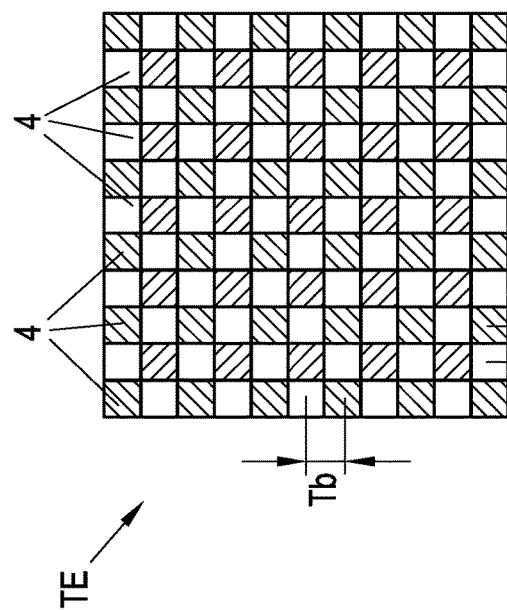
Figure 4C:
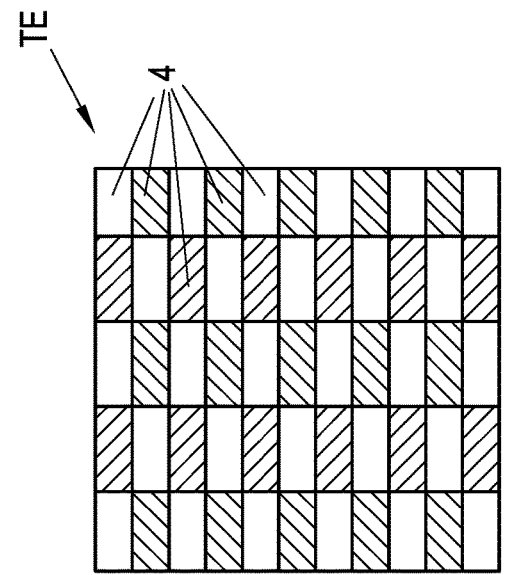
Figure 4D:
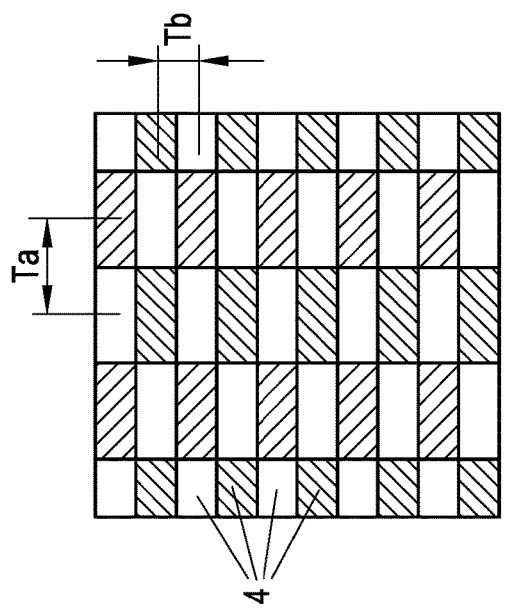

Coil properties influencing the magnetic field refer to changeable structural or energetic parameters of the drive coils ASi, by means of which the magnetic field generated by the drive coils ASi, in particular the magnetic flux, can be influenced. These include, e.g., an average coil spacing Si of the drive coils ASi in the normal direction from the drive magnets 4 of the transport unit TE interacting therewith (FIG. 1b), a coil pitch TASi of adjacent drive coils ASi in a coil group SGi, a conductor resistance of the drive coils ASi, a maximum coil current that can be applied to drive coils ASi, a number of windings of the drive coils ASi, and a coil geometry of the drive coils ASi. Coil geometry refers in particular to the longitudinal extension LASi and the transverse extension QASi of the drive coils ASi parallel to the transport plane 3, as well as a coil height $h_{ASi}$ of the drive coils ASi normal to the transport plane 3, as indicated on the drive coils AS2 in FIG. 1b. Furthermore, the winding scheme also influences the coil geometry of the drive coils ASi, i.e., whether it is a concentrated winding or a distributed winding. The magnetic properties of the drive magnets 4 of the transport unit TE influencing the magnetic field refer to, for example, a remanent flux density of the drive magnets 4, a relative orientation between the drive magnets 4 and the drive coils ASi interacting therewith, a pole pitch Ti of the drive magnets 4, and a magnetic geometry of the drive magnets. The magnet geometry relates in particular to a magnet length LMi, the magnet width MBi, and the magnet height HMi, as shown by way of example in FIG. 1b and FIG. 3d.

In the following, some exemplary measures are listed as to how the efficiency μHi of the electromagnetic force formation in a main movement direction Hi of the transport device 1 can be increased by means of the magnetic properties influencing the magnetic field and/or the coil properties influencing the magnetic field. Of course, several magnetic properties and/or coil properties can also be changed.

The relative orientation between the drive magnets 4 and the drive coils ASi should be such that the conductor orientation of the drive coils ASi is orthogonal to the magnetic field generated by the drive magnets 4. In practice, this is achieved, for example, by using elongated drive coils ASi and elongated drive magnets 4, arranged as parallel as possible to the longitudinal extension LASi, of the magnet group MGi interacting therewith (see, e.g., FIG. 1a). In addition, the relative orientation between the drive coils ASi of a coil group SGi (e.g., SG1) and the magnet group MGi (e.g., MGb), which predominantly interacts with the drive coils ASi of the respective other coil group SGi (e.g., SG2), should be as orthogonal as possible, so that few or no coupling effects can develop. In the example according to FIG. 1a, this is achieved, for example, in that the drive magnets 4 of the second magnet groups MGb are arranged as parallel as possible to the transverse extension QAS1 of the drive coils ASi of the first coil group SG1. The distance between a conductor of a drive coil ASi and the drive magnet 4 interacting therewith (corresponds to the average coil spacing Si in the examples shown) should be as small as possible, since the flux density decreases exponentially with the normal distance.

The conductor resistance of the drive coil ASi should be as low as possible. Options for reducing the conductor resistance are, e.g., providing a so-called "covered length" of a drive coil ASi that is as high as possible and/or increasing the cross section of the conductors of a drive coil ASi. The "covered length" is the part of the conductor which is located in the range of influence of the magnetic field of the drive magnets 4. The "covered length" should preferably correspond to the entire extension of the conductor or the drive coil ASi. If a plurality of conductors is used to generate the driving force/levitation force, which is usually realized by using drive coils ASi, a high copper fill factor is advantageous (the definition of the copper fill factor is generally known and essentially corresponds to the ratio between the sum of the cross-sectional surface of the individual conductors of a coil to the total cross-sectional surface of the coil). Since the specific resistance of a conductor increases with temperature, the efficiency of a conductor can be increased by reducing the temperature, e.g., by dissipating heat.

The maximum force that can be generated on the transport unit TE (both in the movement direction and in the vertical direction) can be influenced, for example, by the maximum coil current that can be applied to the drive coils ASi (which is essentially limited by the power electronics) and/or by the coil geometry and the number of windings. The accuracy of the positioning of the transport unit TE can be influenced, for example, by the size of the coil pitch TASi. The coil pitch TASi designates the distance between adjacent drive coils ASi, usually between the coil axes, as indicated by way of example in FIG. 1a on the drive coils AS2 of the second coil group SG2. From this, it can be seen that there is a wealth of parameters with which the efficiency μHi of the movement of the transport unit TE, the maximum force that can be generated on the transport unit TE and/or the positional accuracy of the movement of the transport unit TE can be influenced. Of course, it would be possible to try to optimize all or the highest possible number of coil properties of the drive coils ASi influencing the magnetic field and the magnetic properties of the drive magnets 4 influencing the magnetic field. However, this is often not possible or desirable, e.g., for reasons of cost efficiency. For cost reasons, for example, it can be advantageous to use coils of identical design for the drive coils AS1 of the first coil group SG1 and the drive coils AS1 of the second coil group SG2, which means that, for example, in the case of different average coil spacings S1≠S2 of the drive coils AS1, AS2, the result would be an essentially automatic difference in efficiency. In the following, using FIG. 1*a*-1*c*, different average coil spacings S1≠S2 of the drive coils AS1, AS2 will be addressed, wherein the remaining coil properties influencing the magnetic field and the magnetic properties influencing the magnetic field are uniform in both main movement directions H1, H2.

The drive coils AS1 of the first coil group SG1 are spaced apart from the first magnet group MGa in the normal direction (in this case in the Z-direction) on the transport plane 3 at an average first coil spacing S1, and the drive coils AS2 of the second coil group SG2 are spaced apart from the second magnet group MGb, relative to the average first coil spacing S1, at a greater average second coils spacing S2 in the normal direction on the transport plane 3, as can be seen in FIG. 1*b*. The drive coils AS1 of the first coil group SG1 are therefore closer to the drive magnets 4 of the first magnet group MGa in the Z-direction than the drive coils AS2 of the second coil group SG2 are to the drive magnets 4 of the second magnet group MGb. In the example shown in FIG. 1*b*, the two coil groups SG1, SG2 are arranged one above the other.

The average coil spacings S1, S2 are measured from the coil center of the respective drive coils AS1, AS2 as seen looking in the Z-direction. The drive coils AS1, AS2 are preferably designed to be ironless in order to avoid disruptive magnetic attraction forces between the respective transport unit TE and the transport segment 2; they are also called "air coils." In the example shown in FIG. 1*a*+1*b*, the drive coils AS1, AS2 are designed as conventionally wound, elongated coils with an essentially oval shape, each having a coil axis in the normal direction on the transport plane 3. However, the drive coils AS1, AS2 could also be designed as so-called PCB coils. The drive coils AS1, AS2 of the respective coil group SG1, SG2 can, for example, also be arranged in layers in several first coil planes SE1 with first drive coils AS1 and several second coil planes SE2 with second drive coils AS2 in the normal direction on the transport plane 3 one above the other on the transport segment 2, as shown in FIG. 1*c*.

In the example on the left of FIG. 1*c*, a coil block with four first coil planes SE1 and a coil block with four second coil planes SE2 are arranged one above the other on the transport segment 2. In the depiction on the right in FIG. 1*c*, four first and four second coil planes SE1, SE2 are arranged alternately on the transport segment 2 in the Z-direction. The average coil spacings S1, S2 are in this case the average distances of the coil planes SE1, SE2 from the transport plane 3 in the Z-direction, wherein the following applies $$S1 = \frac{\sum_{i=1}^{j} S1.i}{j}; S2 = \frac{\sum_{i=1}^{k} S2.i}{k}$$

with the coil spacing S1.*i*, S2.*i* of the first and second coil planes SE1, SE2 and number j, k of the first and second coil planes SE1, SE2.

At the same structural boundary conditions (identical geometry (length, width, height), same number of windings) and the same energetic boundary conditions (same maximum current or voltage, etc.), the drive coils AS1 of the first coil group SG1 generate the same (maximum) magnetic field as the drive coils AS2 of the second coil group SG2. The magnet groups MGa, MGb on the transport unit TE are designed to be essentially identical (same geometry (magnet length, magnet width, magnet height), same number of drive magnets 4, same pole pitch Ti, same magnetization directions, same magnetic field strength, etc.), so that the magnet groups MGa, MGb generate magnetic fields of essentially the same size, which interact with the magnetic fields generated by the drive coils AS1, AS2. However, since the drive coils AS1 of the first coil group SG1 are on average closer to the drive magnets 4 of the first magnet group MGa than the drive coils AS2 of the second coil group SG2 are to the drive magnets 4 of the second magnet group MGb, the result is a higher efficiency of the electromagnetic force generation in the first main movement direction H1 than in the second main movement direction H2. This affects both the generation of the driving force and the generation of the levitation force. This results in a known manner in a greater efficiency in the first main movement direction H1 than in the second main movement direction H2.

FIG. 2*a*-2*e* schematically show different options for arranging the drive coils AS1, AS2 of the first and second coil groups SG1, SG2 on a transport segment 2. FIG. 2*a*+2*b* show so-called "single-layer" variants in which the first and second coil groups SG1, SG2 are arranged in the same plane. FIG. 2*c*-2*e* show so-called "multi-layer" designs in which the first and second coil groups SG1, SG2 are arranged in layers one above the other in the vertical direction, as explained above with reference to FIG. 1*b*+1*c*. For example, in the "double-layer" design, two layers of drive coils AS1, AS2 arranged one above the other are provided. The first main movement direction H1 (with higher efficiency μH1>μH2) thus results essentially automatically (with otherwise the same coil properties influencing the magnetic field and magnetic properties influencing the magnetic field) because the drive coils AS1 of the first coil group SG1 are closer to the transport plane 3 in the normal direction on the transport plane 3 than the drive coils AS2 of the second coil group SG2.

The "single-layer" design is usually used for transport devices 1 with two equivalent main movement directions H1, H2. In this case, the drive coils AS1, AS2 of the first and second coil group SG1, SG2 each have the same coil spacing S1=S2 from the transport plane 3. With otherwise the same coil properties influencing the magnetic field and magnetic properties influencing the magnetic field, essentially the same efficiencies μH1=μH2 would result for the two main movement directions H1, H2. As described above, in addition to the coil spacing Si, there are many other coil properties influencing the magnetic field and magnetic properties influencing the magnetic field, the change of which can change the efficiencies μH1, μH2. It would therefore basically also be conceivable with a "single-layer" design to generate different efficiencies μH1≠μH2 of the two main movement directions H1, H2, for example, through a different pole pitch Ta≠Tb of the drive magnets 4 of the two magnet groups MGa, MGb and/or a different magnet geometry of the drive magnets 4 of the two magnet groups MGa, MGb.

FIG. 2a. shows a so-called "herringbone" arrangement of the drive coils AS1, AS2 of the two coil groups SG1, SG2. In contrast to the other designs of FIG. 2b-2e, the two main movement directions H1, H2 do in this case not run parallel to the edges of the transport segment 2 (in this case in the X- and Y-direction), but obliquely to them. Details hereto are disclosed, for example, in Jansen, J. W., 2007. *Magnetically levitated planar actuator with moving magnets. In: electromechanical analysis and design Eindhoven: Technical University of Eindhoven DOI:* 10.6100/1R630846. FIG. 2c shows a "double-layer" embodiment in which "long" drive coils AS1, AS2 are provided both in the first coil group SG1 and in the second coil group SG2. FIG. 2d shows an embodiment with "long" drive coils AS1 in the first coil group SG1 and "short" drive coils AS2 in the second coil group SG2, analogously to FIG. 1a. FIG. 2e shows an example with "short" drive coils AS1 in the first coil group SG1 and "short" drive coils AS2 in the second coil group SG2.

FIG. 3a-f and FIG. 4a-d schematically show different arrangements of drive magnets 4 on a transport unit TE. A basic distinction is made between a so-called 1D arrangement (FIG. 3a-3f) and a 2D arrangement (FIG. 4a-4d). In the 1D arrangement, as already described in detail, at least one first magnet group MGa with a plurality of drive magnets 4 for the first main movement direction H1 (in this case X-axis) and at least one second magnet group MGb with a plurality of drive magnets 4 for the second main movement direction H2 (in this case Y-axis) are provided. The magnet groups MGa, MGb each have a specific number of drive magnets 4, in particular permanent magnets, arranged one behind the other in a specific arrangement direction (in this case MGa in the X-direction and MGb in the Y-direction). Adjacent drive magnets 4 have a different magnetization direction. For example, the magnetization direction of adjacent drive magnets 4 can be rotated by 180° to one another, i.e., alternating magnetic north and south poles, as indicated by the shaded and not shaded drive magnets 4. As mentioned above, the drive magnets 4 of a magnet group MGi can also be arranged in the known Halbach arrangement, wherein a drive magnet 4 with a magnetization direction rotated by 90° is provided, for example, between drive magnets 4 with opposite magnetization directions (north pole, south pole). The Halbach arrangement has the advantage that the magnetic flux on one side of the magnet group MGi (preferably on the side facing the transport plane 3) is greater than on the opposite side. A particularly advantageous, sinusoidal magnetic field image of the magnetic field of a magnet group MGi can be achieved if the respective outermost drive magnets 4 of the magnet group MGi have a reduced, in particular half the magnet width MBi than the interjacent drive magnets 4 of the magnet group MGi, as is shown, for example, in FIG. 7. The Halbach arrangement is known in the prior art and therefore no further details are provided at this point.

In the 2D arrangement, individual drive magnets 4 with different magnetization directions are arranged on the transport unit TE essentially in the manner of a chessboard. The drive magnets 4 with different magnetization directions are arranged alternately and offset in two arrangement directions (in this case X- and Y-direction). The two directions are preferably oriented to one another in the same way as the two main movement directions H1, H2, i.e., they are, for example, perpendicular to one another. It is immediately apparent that there is a large number of different options for the arrangement, wherein the most common variants of the 1D arrangement are shown in FIG. 3a-3f and the most common variants of the 2D arrangement are shown in FIG. 4a-4d. In the 2D arrangement, the first magnet group MGa corresponds to the drive magnets 4 arranged alternately in one direction (e.g., in the X-direction) and the second magnet group MGb corresponds to the drive magnets 4 arranged alternately in the respective other direction (e.g., in the Y-direction). The magnet groups MGa, MGb are therefore not separate in the 2D arrangement, as in the 1D arrangement, but the drive magnets 4 are both part of the first magnet groups MGa and part of the second magnet groups MGb.

For example, in order to achieve different efficiencies $\mu H1$, $\mu H2$ and/or different maximum forces and/or different positioning accuracy of the transport unit TE in a "single-layer" arrangement of the coil groups SG1, SG2 (FIG. 2a+2b) on a transport segment 2 (with otherwise identical coil properties of the drive coils AS1, AS2 influencing the magnetic field), the magnetic properties of the drive magnets 4 of the transport unit TE influencing the magnetic field can also be changed, as already mentioned. For example, one option provides that the pole pitch Ta of the first magnet group(s) MGa differs from the pole pitch Tb of the second magnet group(s) MGb, as exemplified in FIG. 3d+3f for the 1D arrangement and in FIG. 4c+4d for the 2D arrangement. If, in the "double-layer" embodiment of the transport segment 2 shown in FIG. 1a-1c, in which the drive coils AS1 of the first coil groups SG1 have a smaller coil spacing S1 than the drive coils AS2 of the second coil group SG2, different pole pitches Ta≠Tb are also provided on the magnet groups MGa, MGb of the transport unit TE, the pole pitch Ta of the first magnet group MGa (which interacts with the first coil group SG1) is preferably smaller than the pole pitch Tb of the second magnet group MGb. This is advantageous because the magnetic field generated by the drive magnets 4 penetrates further into the transport segment 2 with increasing pole pitch Ti in the Z-direction. Therefore, the magnet group MGi with the greater pole pitch Ti interacts more efficiently with the drive coils ASi of the more distant coil group SGi.

As initially mentioned, attempts have been made in the prior art to compensate for the difference in efficiency between the two main movement directions H1, H2 in order to achieve main movement directions that are as equivalent as possible in terms of the available electromagnetic force. However, in the case of the present invention, the difference in efficiency between the two main movement directions H1, H2 is used in a targeted manner, as will be explained in more detail below.

Figure 5:
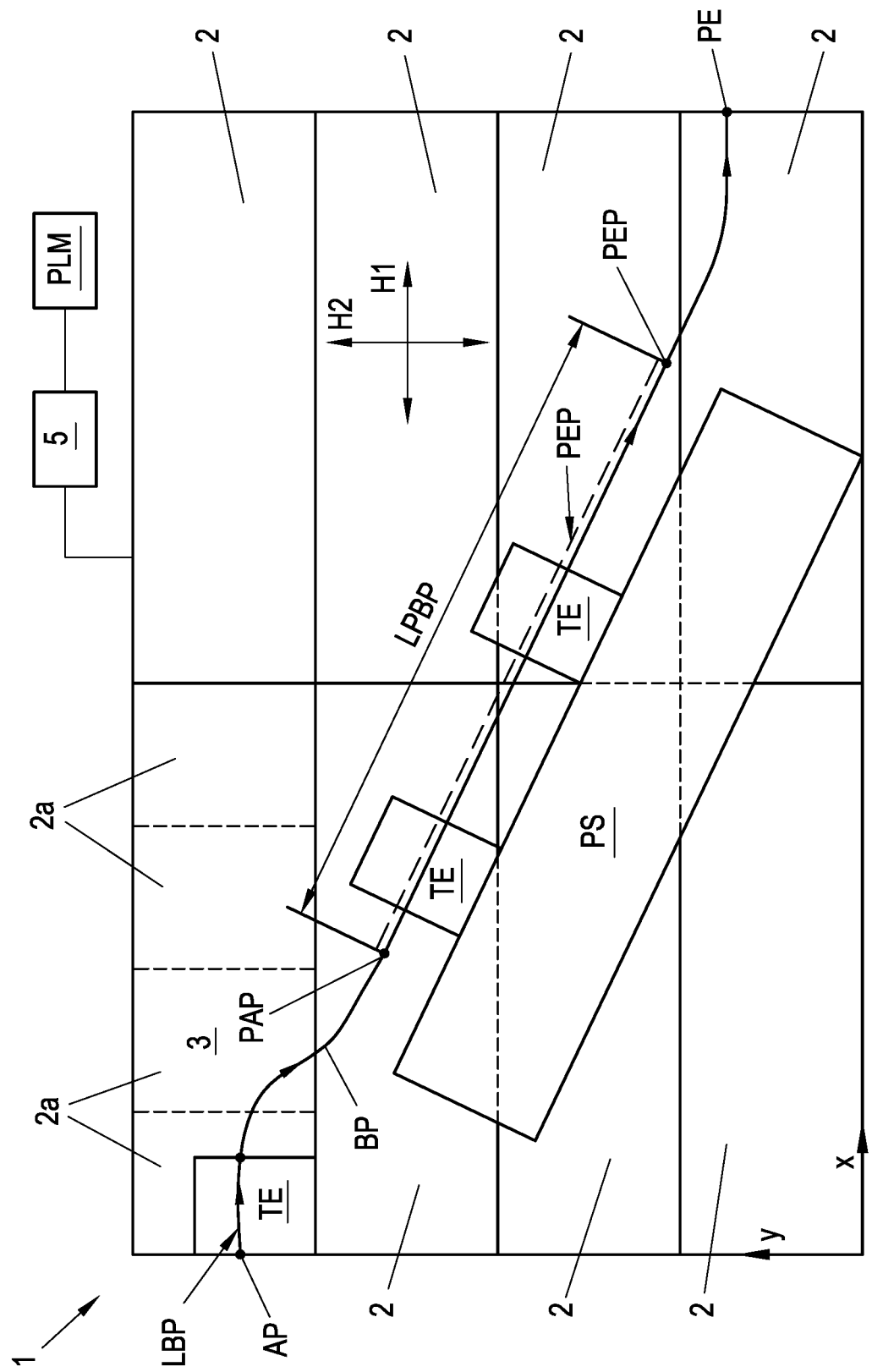
FIG. 5 shows an exemplary design of a transport device in the form of a planar motor with a process station.

FIG. 5 shows a transport device 1 in which a multiplicity of adjacent transport segments 2 is provided in order to form a transport plane 3 of the desired shape and size. As described above, the transport segments 2 each have a first main movement direction H1 and a second main movement direction H2 which in this case is perpendicular thereto. The second main movement direction H2 has a lower efficiency $\mu H2 < \mu H1$ relative to the first main movement direction H1. The transport segments 2 can be structured, for example, as was shown with reference to FIG. 1a-1c. Specifically, eight identical transport segments 2 are provided, each of which is designed to be rectangular. The transport segments 2 thus each form a rectangular portion of the entire transport plane 3. In the simplest case, however, it is possible to provide only one transport segment 2. Of course, the arrangement according to FIG. 5 is only to be understood as an example and the transport segments 2 could also have a different shape, for example, a square shape, as indicated by the transport segments 2a, and/or they could be joined together in a different way to form one transport plane 3 with another shape. In the simplest case, it is possible to provide only one single transport segment 2.

The transport segments 2 each border with the short side on the short side of an adjacent transport segment 2 and with the long side, they border on the long side of another adjacent transport segment 2. As a result, the first and the second main movement directions H1, H2 of the individual transport segments 2 each run parallel to one another. Of course, this is not absolutely necessary, and the arrangement could also be arbitrarily different. The adjoining transport segments 2 thus form a single large transport plane 3 in which one or more transport units TE can be moved at least in a two-dimensional manner. As described above, depending on the structural design of a transport unit TE (e.g., depending on the design and the arrangement of the drive magnets 4 in a 1D arrangement (FIG. 3*a-f*) or 2D arrangement (FIG. 4*a-d*), further degrees of freedom are also possible (movement in the vertical direction, rotation about the three spatial axes).

Within the scope of the invention, it is assumed that a movement path BP between a defined starting point AP and a defined end point EP is predefined for the movement of the transport unit TE. The movement path BP is thus initially independent of the transport device 1 and can be defined, for example, on the basis of a predefined production process in which the transport device 1 is used. For example, it can be required for the production process that objects are to be transported along the predefined movement path BP from the starting point AP to the end point EP. For example, for carrying out the production process, different process stations PSi can also be provided on the transport device 1 between which the transport units TE are movable, as will be explained in more detail below with reference to FIG. 6.

In order to make use of the property of the different efficiencies (in this case μH1>μH2) of the two main movement directions H1, H2 (and/or the different maximum force that can be generated on the transport unit TE and/or the different positioning accuracy) of the transport device 1, it is provided according to the invention that the at least one transport segment 2 is oriented relative to the predefined movement path BP such that the movement path BP lies on the transport plane 3 in such a manner that a first movement path proportion BPA1 of the first main movement direction Hi at the length LBP of the movement path BP is greater than or equal to a second movement path proportion BPA2 of the second main movement direction H2 at the length LBP of the movement path. The length LBP of the movement path refers to the actual geometric length of the movement path BP, i.e., the length between the starting point PA of the movement path BP and the end point PE of the movement path BP in the movement direction. The length LBP of the movement path is therefore the distance that the transport unit TE covers if it is moved along the movement path BP from the starting point PA to the end point PE.

The transport segment 2 is thus oriented relative to the externally predefined movement path BP such that the movement path BP lies entirely on the transport plane 3, so that the transport unit TE is movable in the transport plane 3 between the starting point AP and the end point EP. The orientation of the transport segment 2 according to the invention relative to the movement path BP also ensures that a predominant part of the movement of the transport unit TE takes place in the first main movement direction H1 with greater efficiency μH1. In order to achieve the most efficient operation possible, it is particularly advantageous if the at least one transport segment 2 is oriented relative to the movement path BP such that the first movement path proportion BPA1 of the first main movement direction H1 is maximized along a length LBP of the movement path BP.

Of course, in the event that the arrangement of the transport segment or segments 2 is predefined and the movement path BP can be freely selected, the reverse way can also be selected. In this case, the orientation of the transport segment 2 is not adjusted to the predefined movement path BP, but the movement path BP is determined in the transport plane 3 such that the first movement path proportion BPA1 of the first main movement direction H1 at the length LBP of the movement path BP is greater than or equal to a second movement path proportion BPA2 of the second main movement direction H2 at the length LBP of the movement path. The same naturally also applies to the process movement paths PBPi and transition paths UPi of the following embodiments.

The movement path BP is essentially made up of coordinates in the two main movement directions H1, H2, in this case in the X-direction and the Y-direction. In the arrangement of the transport segments 2 shown in FIG. 5 with parallel first and second main movement directions H1, H2, the X-direction corresponds in the entire transport plane 3 to the first main movement direction H1, and the Y-direction corresponds in the entire transport plane 3 to the second main movement direction H2. If a plurality of transport segments 2 is put together to form a transport plane 3, the movement path BP can extend over part or the entire transport plane 3, i.e., over a plurality of transport segments 2. If only one transport segment 2 is provided in the transport device 1, the movement path BP extends only in the transport plane 3 formed by said one transport segment 2.

In order to move the transport units TE along the movement path BP, the drive coils AS1, AS2 of the transport segments 2 required for said movement can be controlled, e.g., by the control unit 5 of the transport device 1. Of course, a separate segment control unit can also be provided for each transport segment 2, which is connected to the control unit 5 of the transport device 1 and/or a separate coil control unit could also be provided for one or more drive coils AS1, AS2. As mentioned above, the control unit 5 of the transport device 1 can be connected, for example, to a planning module PLM for determining a movement path BP. Different movement paths BP could thus be planned and then transferred to the control unit 5 of the transport device 1, which controls the drive coils AS1, AS2 accordingly in order to move the transport units TE along the desired movement path BP.

According to an advantageous embodiment, at least one process station PS is provided in the transport device 1 for carrying out a work process on an object O transported with the transport unit TE, as schematically shown in FIG. 5. In the region of the process station PS, a process movement path PBP is determined as part of the movement path BP, along which the transport unit TE is movable in the transport plane 3 for carrying out the work process (indicated by dashed lines in FIG. 5). The process station PS can essentially have any configuration, i.e., have any shape and size. A process station PS can, for example, be arranged laterally next to a transport segment 2, so that the process station PS (as seen looking normally onto the transport plane 3) lies outside the transport plane 3 (see FIG. 6). However, the process station PS can also (as seen looking normally onto the transport plane 3) lie within the transport plane 3, as shown by way of example using the process station PS in FIG. 5.

However, the specific configuration, type, shape, and size of a process station PS is irrelevant for the invention and depends essentially on the production process to be carried out in which the transport device 1 is used. For example, containers as objects O could be transported with the transport units TE and the process station PS could be a filling system for a specific process medium, such as a bottle filling system. The transport units TE could then, for example, also be moved below the filling system along a predefined process movement path PBP and be filled continuously or intermittently during the movement. However, in a process station PS, it would also be possible to carry out a specific processing step on a workpiece (as object O) transported with the transport units TE. A further example of a process station could be, e.g., a measuring station in which a specific measuring process can be carried out on an object O by means of a suitable measuring instrument, e.g., a camera system. The loading and unloading of the transport unit TE with an object O is an exemplary work process within a process station PS. From this, it can be seen that there can be an abundance of different possible process stations PS.

A generic process station PS for carrying out a generic work process is shown representatively in FIG. 5. In this case, the process station PS has an essentially rectangular base surface and is arranged within the transport plane 3 (seen in a plan view of the transport plane 3). A process movement path PBP runs along a long side of the process station PS as part of the movement path BP, along which the transport units TE are movable in the transport plane 3. The process movement path PBP runs essentially parallel to the long side of the process station PS between a process starting point PAP and a process end point PEP, as indicated by dashed lines.

The process movement path PBP also does not have to extend over the entire process station PS, for example, if only part of the process station PS is used (e.g., if only part of the available filling devices is used in a filling system). The process movement path PBP is generally the portion of the movement path BP lying in the region of a process station PS, in which an interaction between the transport unit TE (or an object O transported with it) and the process station PS takes place in order to carry out a work process. The process station PS shown in FIG. 5 is arranged obliquely (only by way of example), so that the process movement path PBP (which runs parallel to the long side of the process station PS) does not run parallel to the X-direction and not parallel to the Y-direction.

The process station PS and the transport segment 2 (or in this case the plurality of transport segments 2) are preferably oriented relative to one another such that a first process movement path proportion PBPA1 of the main movement direction H1 at a process movement path length LPBP of the process movement path PBP is greater than or equal to a second process movement path proportion PBPA2 of the second main movement direction H2 at the process movement path length LPBP. The orientation is particularly preferably carried out such that the first process movement path proportion PBPA1 is at a maximum. This ensures that a transport unit TE is also moved in the region of the process station PS predominantly in the first main movement direction H1 with greater efficiency, as a result of which the efficiency of the operation of the transport device 1 can be further increased. This arrangement can also be advantageous if a higher maximum force can be generated on the transport unit TE in the first main movement direction H1 than in the second main movement direction H2 because process forces acting on the transport unit TE during the work process in the process station PS, for example, can be better supported electromagnetically.

Figure 6:
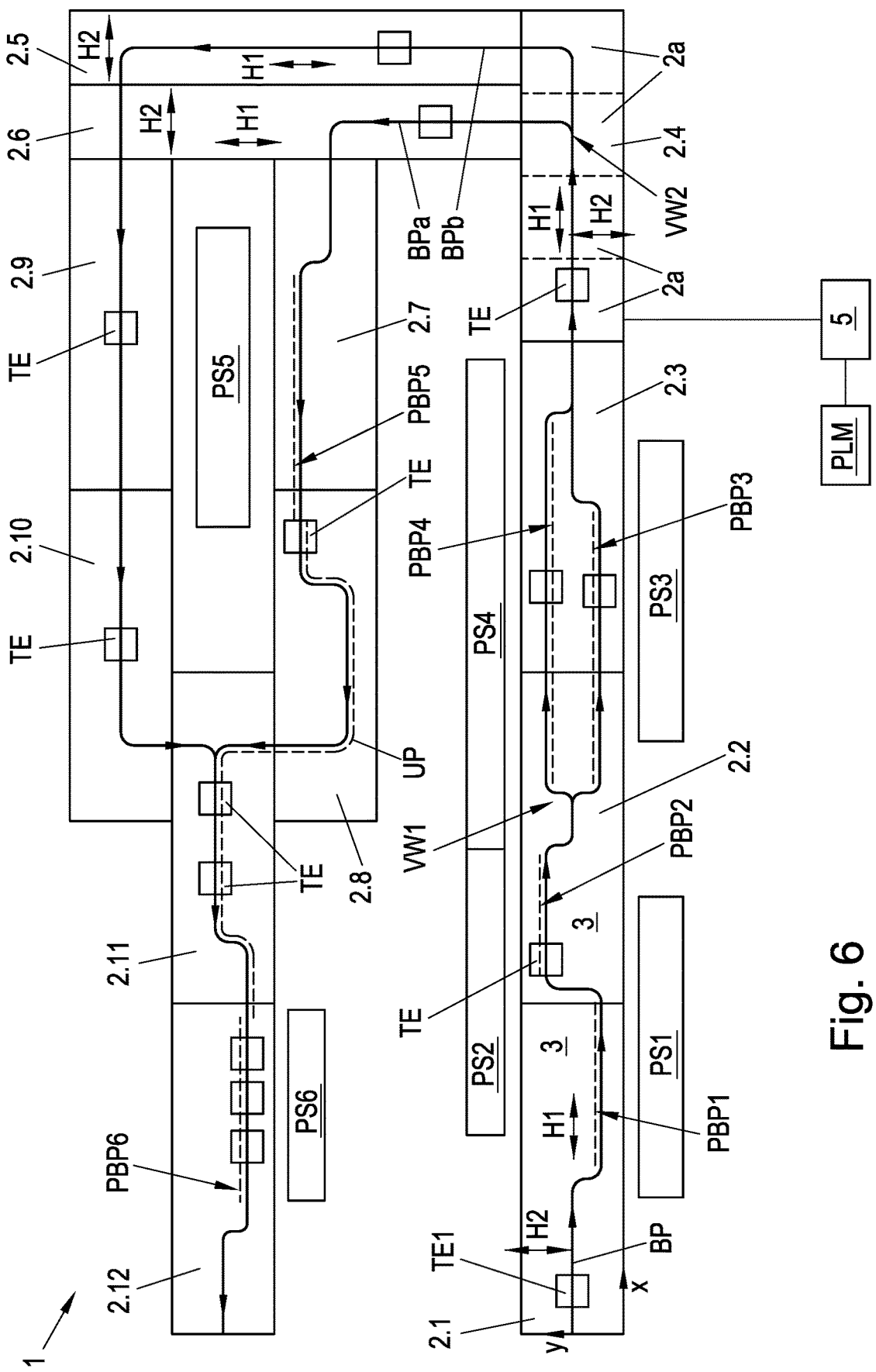
FIG. 6 shows a further exemplary design of a transport device in the form of a planar motor with a plurality of process stations.

However, a plurality of process stations PSi is frequently provided in the transport device 1, each for carrying out a respective work process on an object O transported with the transport unit TE, as illustrated by the transport device 1 according to FIG. 6. A multiplicity of identical transport segments 2.1-2.12 are lined up in the transport device 1 in order to form a transport plane 3. As before, the transport segments 2.1-2.12 are rectangular, designed with a long side and a short side and in turn each have a first main movement direction H1 with a higher efficiency $\mu H1$ and a second main movement direction H2 with a relatively lower efficiency $\mu H2 < \mu H1$. The first main movement direction H1 extends parallel to the long side and the second main movement direction H2 extends parallel to the short side of the rectangular transport segments 2. Alternatively or additionally, differently designed transport segments 2 could also be provided analogous to the previous example according to FIG. 5. Four essentially square transport segments 2a, which could be arranged instead of the transport segment 2.4, are only indicated as an example. At this point, it must be mentioned that the depicted transport devices 1 only show exemplary configurations that do not restrict the invention.

The transport segments 2.1-2.4 are aligned one behind the other in the longitudinal direction (X-direction), with their respective short sides adjacent to one another. The first main movement directions H1 of the transport segments 2.1-2.4 are thus oriented parallel and essentially coaxially in the direction of the X-axis and the respective second main movement directions H2 run parallel to one another in the direction of the Y-axis. Process stations PS1-PS4, which partially extend over two of the transport segments 2.1-2.3, are arranged on both sides of the transport segments 2.1-2.4. The transport units TE can thus be moved in the transport plane 3 along the first main movement direction H1 parallel to the process stations PS1-PS4 and in the second main movement direction H2 normal to the process stations PS1-PS4. Two further transport segments 2.5, 2.6 are arranged adjacent to the transport segment 2.4, which adjoin the long side of the transport segment 2.4 with their respective short side. The respective first main movement direction H1 of the two transport segments 2.5, 2.6 is thus perpendicular to the first main movement direction H1 of the transport segment 2.4.

The remaining transport segments 2.7-2.12 are assembled in an analogous manner in order to form the remaining portion of the transport plane 3. The process station PS5 is arranged centrally in the Y-direction between the transport segments 2.7, 2.8 and the transport segments 2.9, 2.10. For example, it would be possible to carry out a work process only on one side of the process station PS5 (e.g., only on the transport segments 2.7, 2.8) but also on both sides. In the case of a work process on only one side, the respective other side (e.g., the transport segments 2.9, 2.10) could be used, for example, as a kind of bypass in order to move transport units TE past the process station PS5 without carrying out a work process. The transport units TE can be brought together again on the transport segment 2.11. Furthermore, this path could be used as a kind of return to repeat the work process. A bypass and/or a return can also be realized on a single transport segment, provided that the geometric size of the transport units TE makes it possible. FIG. 6 shows, by way of example, different options for a movement path BP, along which the transport units TE can be moved in the transport plane TE.

For example, the movement path BP can also have a kind of virtual switch VW at which the movement path BP divides into two (or more) parallel movement path portions, as is shown by way of example on the transport segment 2.2 using the first virtual switch VW1. It is virtual because the switch is not a physical unit but can essentially be determined arbitrarily in the transport plane 3, for example, in the planning module PLM. In the example shown, the movement path BP divides in the first virtual switch VW1 into an (upper) fourth process movement path PBP4 that runs along the fourth process station PS4 and a (lower) third process movement path PBP3 that runs along the third process station PS3. The process movement paths PBPi of the individual process stations PSi are indicated by dashed lines in FIG. 6.

This means that, for example, specific transport units TE can be steered selectively along the fourth process movement path PBP4 and other transport units TE can be steered along the third process movement path PBP3. The two parallel movement path portions, in this case the fourth process movement path PBP4 and the third process movement path PBP3, can be brought together again at a suitable point to form a common movement path BP, in this case, e.g., on the transport segment 2.3.

The same applies analogously to the second virtual switch VW2 on the transport segment 2.4, where the movement path is divided into two parallel movement path portions BPa, BPb. In this case, the first movement path portion BPa runs partially on the transport segment 2.6 and extends further over the transport segments 2.7 and 2.8 in order to guide the transport units TE to the fifth process station PS5. In the region of the fifth process station PS5, the first movement path portion BPa has a fifth process movement path PBP5 as part of the movement path BP. In this case, the second movement path portion BPb runs partially on the transport segment 2.5 and extends further over the transport segments 2.9 and 2.10 in order to move the transport units TE past the fifth process station PS5. The first and second movement path portion BPa, BPb reunite at the transport segment 2.11 and run as a common movement path BP to the end of the transport plane 3 at the transport segment 2.12.

As has already been explained with reference to FIG. 5, it is provided according to the invention that a first movement path proportion BPA1 of the first main movement direction H1 at a movement path length LBP of the movement path BP is greater than or equal to a second movement path proportion BPA2 of the second main movement direction H2 at the movement path length LBP. According to an advantageous embodiment of the invention, it can be provided that a first process movement path proportion PBPA1 of the main movement direction H1 in a sum ΣLPBPi of process movement path lengths LPBPi of the process movement paths PBPi is greater than or equal to a second process movement path proportion PBPA2 of the main movement direction H2 in the sum ΣLPBPi of the process movement path lengths LPBPi. The actual proportions of the main movement directions H1, H2 in the sum of the individual geometric lengths of the process movement paths PBPi are therefore compared.

In this way, it can be ensured, even with a plurality of process stations PSi, that the movement of the transport units TE in the region of the process stations PSi takes place in sum predominantly in the first main movement direction H1 with greater efficiency μH1. For example, one or more process stations PSi could thus also be provided in a transport device 1, the process movement paths PBPi of which run exclusively or predominantly in the second main movement direction H2 (with the lower efficiency μH2) and it would still be ensured that the movement in sum takes place over all process stations PSi predominantly in the first main movement direction H1.

Furthermore, in the region between two process stations PSi, a transition path UP can be determined as part of the movement path BP, along which the transport unit TE is movable in the transport plane 3 from one to the other process station PSi. FIG. 6 shows by way of example a dashed transition path UP with a transition length LUP (in the movement direction) between the fifth process station PS5 and the sixth process station PS6. It is preferably provided for the transition path UP that a first transition path proportion UPA1 of the first main movement direction H1 at the transition path length LUP is greater than or equal to a second transition path proportion UPA2 of the second main movement direction H2. As a result, the transport unit TE can also be moved between two process stations PSi predominantly in the first main movement direction H1. This can also be advantageous, for example, in the event that the drive coils AS1 in the first main movement direction H1 can generate a greater maximum force (driving force+levitation force) than the drive coils AS2 in the second main movement direction H2. If, e.g., relatively high forces are required for the movement of the transport unit TE along the transition path UP, e.g., if the transport unit TE is loaded with a relatively heavy object O in the fifth process station PS5 and accelerated and is decelerated and unloaded again in the sixth process station PS6, the drive coils AS1 in the first main movement direction H1 (with the greater maximum force that can be generated) can advantageously be used to generate the drive and levitation force on the transport unit TE.

In the following, a further advantageous embodiment of the invention is used to describe how a transport device 1 with at least one transport segment 2 with two main movement directions H1, H2 with different efficiencies μH1>μH2 can be operated as efficiently as possible. As is known, the efficiency p of a main movement direction Hi describes the ratio of useful energy to energy supplied and can be specified in the present case of the transport device 1 in the form of a planar motor in the form $$\mu = \frac{Pm}{Pe}.$$

Pm is the mechanical power output and Pe is the electrical power supplied. The mechanical power can be specified as the product of force F and speed v of the transport unit TE with Pm=F*v and the electrical power Pe can be specified as the product of the electrical current I and the electrical voltage U at the drive coils ASi as Pe=U*I. From the losses due to energy conversion, it follows that the efficiency will always be less than 1. The losses can also be specified as power loss Pv=Pe−Pm. In the following, it is assumed that the conductor losses of the drive coils ASi are decisive for the total losses of the planar motor. If copper is used as the material for the conductors of the drive coils ASi (which is often the case), conductor losses are also called copper losses Pcu. Without restricting the invention to copper, the following example is explained using copper losses in place of conductor losses. Of course, the same also applies to any other conductor material.

The following applies to the copper losses $P_{cu,L}$ in a conductor L through which current $I_L$ flows $P_{cu,L}=k_{I,L}*I_L^2$, with a proportionality constant $k_{I,L}$ which typically depends on the conductor cross section, the conductor material, the temperature, and the length of the conductor L. The electromagnetic (Lorentz) force $F_L$ of a current-carrying conductor L in an external magnetic field can be represented in a simplified manner according to $F_L=k_{F,L}*I_L$ with a factor $k_{F,L}$, wherein the factor $k_{F,L}$ is a function of the orientation and length of the conductor L in the vectorial magnetic field. Since the mathematical relationship is fundamentally known, details are not provided at this point. In this way, the copper losses $P_{cu,L}$ for an electromagnetic force $F_L$ generated by means of the conductor L can be calculated according to $$P_{cu,L} = k_{I,L} * \frac{1}{k_{F,L}^2} F_L^2 = k_L F_L^2.$$

In the following, it is assumed for the sake of simplicity that the drive coils ASi of the planar motor can be categorized by two types of conductors L, namely conductor LH1 and conductor LH2. The conductors LH1 correspond to the drive coils AS1 of the first main movement direction H1 (with a higher efficiency µH1) and the conductors LH2 correspond to the drive coils AS2 of the second main movement direction H2 (with a relatively lower efficiency µH2<µH1). In order to maintain the air gap L, i.e., the state of levitation of the transport unit TE, it is necessary that the levitation force FS (which is generated by the electromagnetic interaction of the drive coils AS1 with the drive magnets 4 of the first magnet group(s) MGa and the drive coils AS2 with the drive magnets 4 of the second magnet group(s) MGb) opposing gravitation compensates for the weight force FG of the transport unit TE plus any constant process forces FP (in the gravitational direction). Depending on the installation situation of the transport segment 2 of the transport device 1, the levitation force FS does not necessarily act in the normal direction on the transport plane 3 of the transport segment 2.

The levitation force FS thus compensates for the weight force FG caused by the mass of the transport unit TE and a force component of any process force FP in the gravitational direction, which is generated, for example, by a transported object O. Due to the levitation force FS, the position of the transport unit TE relative to the transport segment 2 can thus be kept constant during operation. As initially mentioned, a specific movement of the transport unit TE in the vertical direction (in this case in the Z-direction) can also take place, which can be achieved by appropriate control of the drive coils AS1, AS2.

The copper losses $P_{cu,H1}$ for an electromagnetic levitation force $F_{S,H1}$ generated by means of the conductors LH1 (=first drive coils AS1) are calculated according to $P_{cu,H1}=k_{H1}*F_{S,H1}^2$ and the copper losses $P_{cu,H2}$ for an electromagnetic levitation force $F_{S,H2}$ generated by means of the coils LH2 (=second drive coils AS2) are calculated according to $P_{cu,H2}=k_{H2}*F_{S,H2}^2$. The total levitation force required $FS=F_{S,H1}+F_{S,H2}$ is now advantageously distributed to the coil categories H1 (drive coils AS1) and H2 (drive coils AS2) according to the relationship $F_{S,H1}=\kappa*FS$ and $F_{S,H2}=(1-\kappa)*FS$ with a distribution factor $0\leq\kappa\leq1$ in favor of the drive coils ASi with the higher efficiency µ (in this case the drive coils AS1 of the first main movement direction H1). Advantageously, the distribution factor $\kappa$ is selected such that the total copper losses $P_{cu}=P_{cu,H1}+P_{cu,H2}$ are minimized. Therefore, the expression $P_{cu}=(k_{H1}*\kappa^2+k_{H2}*(1-\kappa)^2)*F_S^2$ must be minimized.

In the case of a symmetrical design of a planar motor with main movement directions H1, H2 with the same efficiencies µH1=µH2, i.e., $k_{H1}=k_{H2}$, the total copper losses $P_{cu}$ are, as expected, the lowest with a symmetrical weighting $\kappa=0.5$. In the present asymmetrical case, with a first main movement direction H1 with efficiency $\mu_{H1}$ and a second main movement direction H2 with efficiency $\mu_{H2}<\mu H1$, i.e., $k_{H1}\neq k_{H2}$, the optimal distribution factor $\kappa$ is a function of the parameters $k_{H1}$ and $k_{H2}$ and can be determined by solving the extreme value problem of the above equation of the total copper losses $P_{cu}$ to get $$\kappa = \frac{k_{H2}}{k_{H1} + k_{H2}}.$$

Depending on the installation situation, corresponding force components of the levitation force FS in the first main movement direction H1, in the second main movement direction H2, and in the normal direction on the transport plane 3 result on the basis of an inclination of the transport segment 2. The force component of the levitation force FS in the normal direction can generally be applied both by the drive coils AS1 of the first coil group SG1 and by the drive coils AS2 of the second coil group SG2. The force component of the levitation force FS in the first main movement direction H1 is generally applied only by the drive coils AS1 of the first coil group SG1 and the force component of the levitation force FS in the second main movement direction H2 is generally only applied by the drive coils AS2 of the second coil group SG2. In the event of an inclination about more than one axis, the levitation force FS is thus divided between the drive coils AS1, AS2 in accordance with the inclination. With a non-horizontal installation situation of the transport segment 2, the distribution factor $\kappa$ of the levitation force FS is a function of the inclination of the transport segment 2.

The selection of an optimal distribution factor $\kappa$ for the horizontal installation situation is explained in more detail below with reference to FIG. 7, wherein, for the sake of simplicity, it is assumed that the (with regard to the second main movement direction H2) higher efficiency µH1 of the first main movement direction H1 (X-direction—see, e.g., FIG. 1a) is only achieved by a smaller average coil spacing S1<S2 of the drive coils AS1, AS2 and other coil properties influencing the magnetic field and magnetic properties influencing the magnetic field are the same in both main movement directions H1, H2. The efficiency pi is therefore generally a function of the coil spacing Si.

From the previous consideration, the levitation forces $F_{S,H1}, F_{S,H2}$ for the main movement directions H1, H2 can be formulated according to $$F_{S,H1} = k_{F_Z,H1} * I_{H1} = B_{H1} * k_{F_Z} * I_{H1} \text{ or}$$

$$F_{S,H2} = k_{F_Z,H2} * I_{H2} = B_{H2} * k_{F_Z} * I_{H2}$$

respectively. In this case, Bi corresponds to the (average) amount of the magnetic flux density and can be formulated for the two main movement directions H1, H2 according to $$B_{H1} = K_B * e^{-\frac{\pi}{\tau_{H1}}(S1+h_{AS1})} \text{ or}$$

$$B_{H2} = K_B * e^{-\frac{\pi}{\tau_{H2}}(S2+h_{AS2})}$$

respectively, with the coil height $h_{AS1}=h_{AS2}$ of the drive coils ASi (in this case the block of drive coils ASi), the respective average coil spacing Si from the respective magnet group MGi, and the pole pitch Ti of the respective magnet group MGi. In the case of the coil heights, $h_{AS1} \neq h_{AS2}$ being unequal, $$B_{H1} = K_{B1}(h_{AS1}) * e^{-\frac{\pi}{\tau_{H1}}(S1+h_{AS1})} \text{ or}$$

$$B_{H2} = K_{B2}(h_{AS2}) * e^{-\frac{\pi}{\tau_{H2}}(S2+h_{AS2})}$$

applies.

Figure 7:
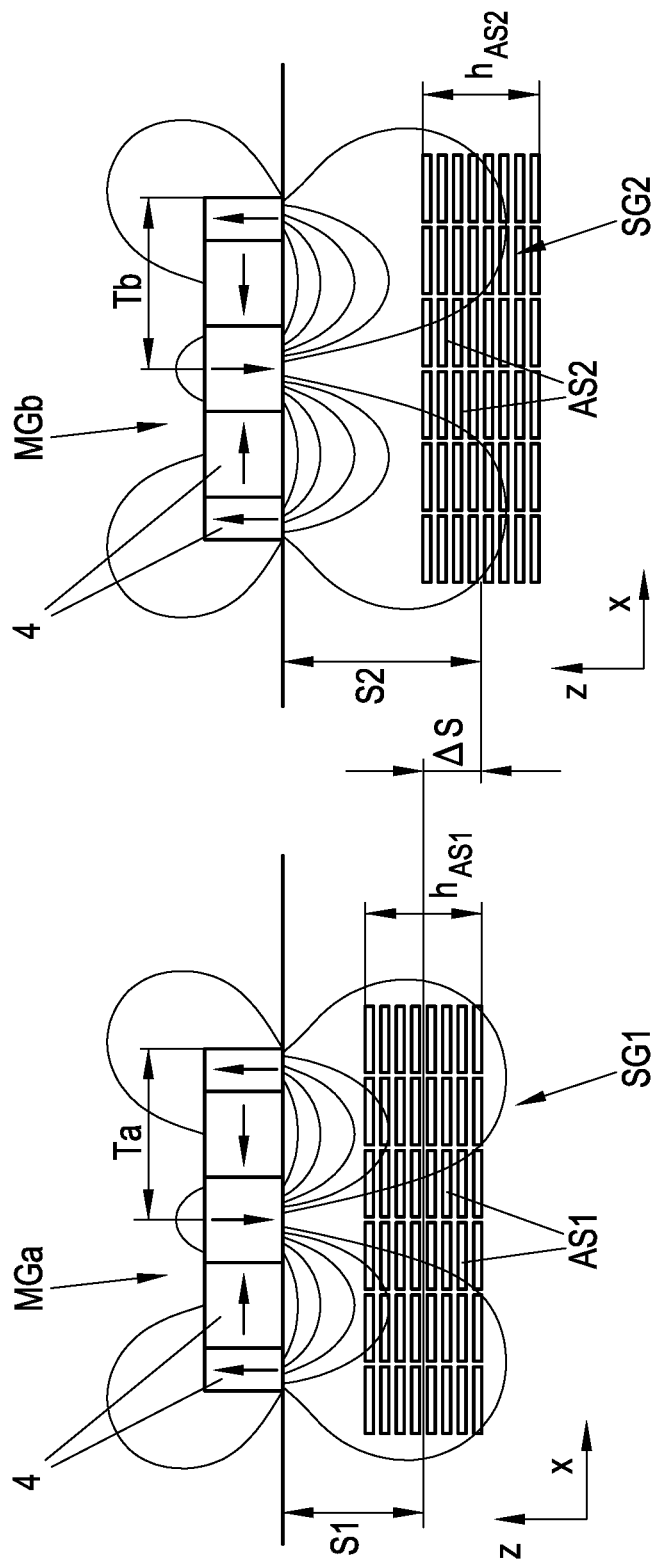
FIG. 7 shows a schematic representation of the interaction of coil groups of a transport segment with magnet groups of a transport unit.

In the example shown in FIG. 7, the two main movement directions H1, H2 are shown separately next to one another for easier identification, wherein the drive coils AS1 of the first coil group SG1 and the first magnet group MGa of the first main movement direction H1 interacting therewith are on the left, and the drive coils AS2 of the second coil group SG2 and the second magnet group MGb of the second main movement direction H2 interacting therewith are on the right. The drive magnets 4 of the magnet groups MGa, MGb are each arranged in the known Halbach arrangement on the transport unit TE. This means that the magnetization direction of adjacent drive magnets 4 is rotated by 90° to one another, as indicated by the arrows in FIG. 7 (with an arrow pointing in the direction of the magnetic south pole). The remaining components of the transport device 1 (e.g., transport segment 2, main body 9 of the transport unit TE) are not shown for reasons of clarity. The field lines of the respectively generated magnetic field are indicated only schematically.

The drive coils AS1 of the first coil group SG1 of the first main movement direction H1 are spaced apart from the first magnet group MGa by an average coil spacing S1. The drive coils AS2 of the second coil group SG2 of the second main movement direction H2 are spaced apart from the second magnet group MGb by an average second coil spacing S2. In this case, S1<S2, $h_{As1}=h_{AS2}$ und Ta=Tb apply in order to fulfill the condition μH1>μH2. In order to maximize the (overall) efficiency μ of the transport device 1, the right-hand side of the above equation for the (overall) copper losses $P_{cu}$ must be minimized. This leads to an optimal distribution factor $$\kappa_{opt} = \frac{1/B_{H2}^2}{1/B_{H1}^2 + 1/B_{H2}^2} = \frac{B_{H1}^2}{B_{H1}^2 + B_{H2}^2}.$$

Figure 8:
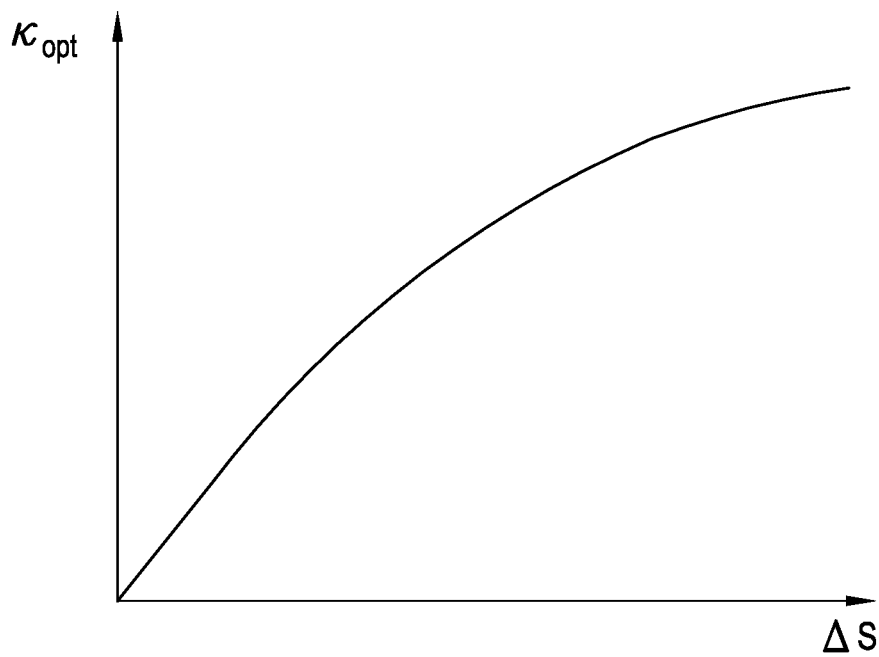
FIG. 8 shows a diagram with a curve of a distribution factor of the levitation force.

FIG. 8 shows a diagram with a curve of the optimal distribution factor $\kappa_{opt}$ plotted against the difference in average coil spacings ΔS=S2−S1 (at a constant air gap L). From the relationship described above, it follows that, in a planar motor with the same average coil spacings S1=S2 of the drive coils AS1, AS2 (with otherwise the same coil properties influencing the magnetic field and magnetic properties influencing the magnetic field), the optimal distribution factor $\kappa_{opt}$ lies, as expected, at $\kappa_{opt}$=0.5. The greater the difference ΔS between the average coil spacings S1, S2, i.e., the further away the drive coils AS2 of the second coil group SG2 are from the drive coils AS1 of the first coil group SG1 in the normal direction of the transport plane 3 from the respective magnet group MGa, MGb, the greater the optimal distribution factor $\kappa_{opt}$ becomes. The optimal distribution factor $\kappa_{opt}$ is therefore independent of the absolute size of the air gap L and therefore depends only on the difference ΔS between the coil spacings S1, S2. By selecting an optimal distribution factor $\kappa_{opt}$, the losses of the transport device 1 with a first main movement direction H1 with efficiency μH1 and a second main movement direction H2 with efficiency μH2<μH1 can be reduced, thus ensuring the most efficient operation of the transport device 1 possible. The greater the difference in efficiency between the two main movement directions H1, H2, the greater the advantage of selecting an optimal distribution factor $\kappa_{opt}$.

Figure 9:
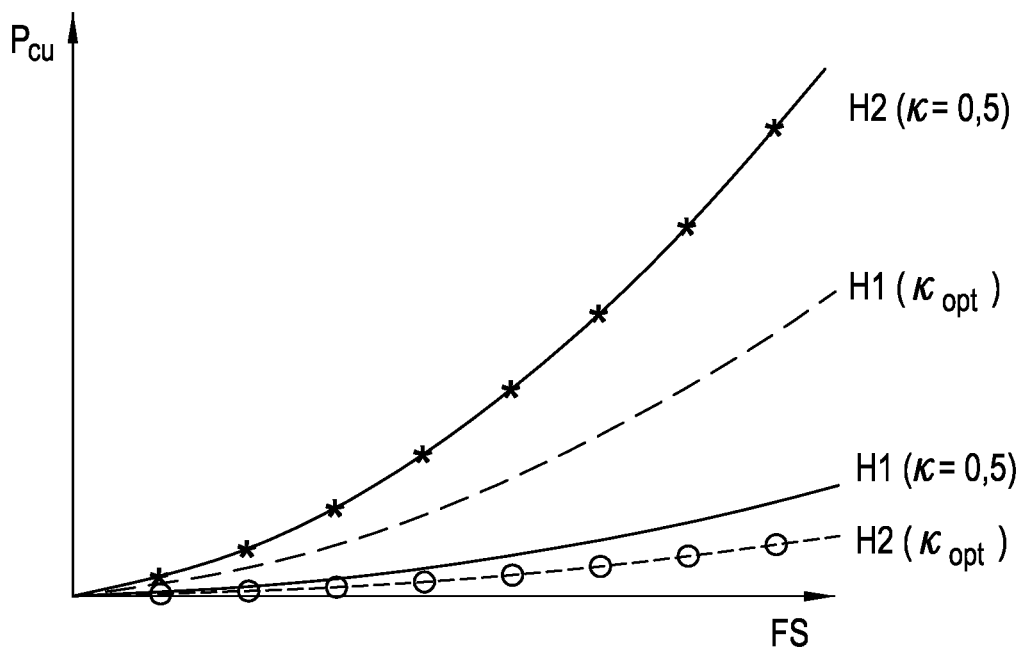
FIG. 9 shows a diagram with curves of copper losses from two main movement directions of a transport segment.

FIG. 9 shows a diagram with qualitative curves of the copper losses $P_{cu,H1}$ and $P_{cu,H2}$ of the two main movement directions H1, H2 over the levitation force FS. The solid line with star markers represents the course of the copper losses $P_{cu,H2}$ of the second main movement direction H2 with conventional distribution κ=0.5, and the solid line without markers shows the course of the copper losses $P_{cu,H1}$ of the main movement direction H1 with conventional distribution κ=0.5. In comparison, the dashed line with round markers shows the course of the copper losses $P_{cu,H2}$ of the second main movement direction H2 with an optimal distribution factor $\kappa_{opt}$, and the dashed line without markers shows the course of the copper losses $P_{cu,H1}$ of the first main movement direction H1 with an optimal distribution factor $\kappa_{opt}$. From this, it can be seen that the sum of the copper losses $P_{cu}$ of the two main movement directions H1, H2, and thus also the overall efficiency of the transport device 1, can be significantly reduced, when compared to a conventional control, by selecting an optimal distribution factor $\kappa_{opt}$.

According to a further advantageous embodiment of the invention, kinematic movement variables of the transport unit TE, such as a speed v and/or an acceleration a of the transport unit TE, can also be taken into account when selecting the distribution factor κ for generating the levitation force FS. For example, it can be advantageous that, during an acceleration of a transport unit TE, e.g., in the first main movement direction H1, another distribution factor κ is selected than at standstill or during phases of constant speed v. The optimal distribution factor $\kappa_{opt}$ can therefore under certain circumstances be lower in acceleration phases (a>0) than when at standstill, since, in addition to generating the levitation force FS, a driving force in the first main movement direction H1 must be generated. In addition to generating the levitation force FS, this results in an additional load on the first drive coils AS1, as a result of which a higher coil current I must generally be applied to the drive coils AS1 when compared to the standstill or a constant speed v. Since the coil current I affects the copper losses $P_{cu,L}=k_{I,L}*I_L^2$ as described in a squared manner in a conductor L through which current $I_L$ flows, disproportionately high copper losses $P_{cu}$ can occur, e.g., in acceleration phases of the transport unit TE. The optimal distribution factor $\kappa_{opt}$ for the standstill of the transport unit TE is therefore no longer valid under certain circumstances in the acceleration phase. It can therefore be advantageous that different optimal distribution factors $\kappa_{opt\_j}=f\{v,a\}$ are determined for different kinematic operating states j of the transport unit TE, such as speed v or acceleration a. The optimal distribution factor or factors $\kappa_{opt\_j}$ can then be stored, for example, in the control unit 5 and the control unit 5 can, depending on the current operating state, determine for a transport unit TE the distribution factor $\kappa_{opt\_j}$ optimal for this operating state and control the drive coils AS1, AS2 with the corresponding coil currents I.

Figure 10:
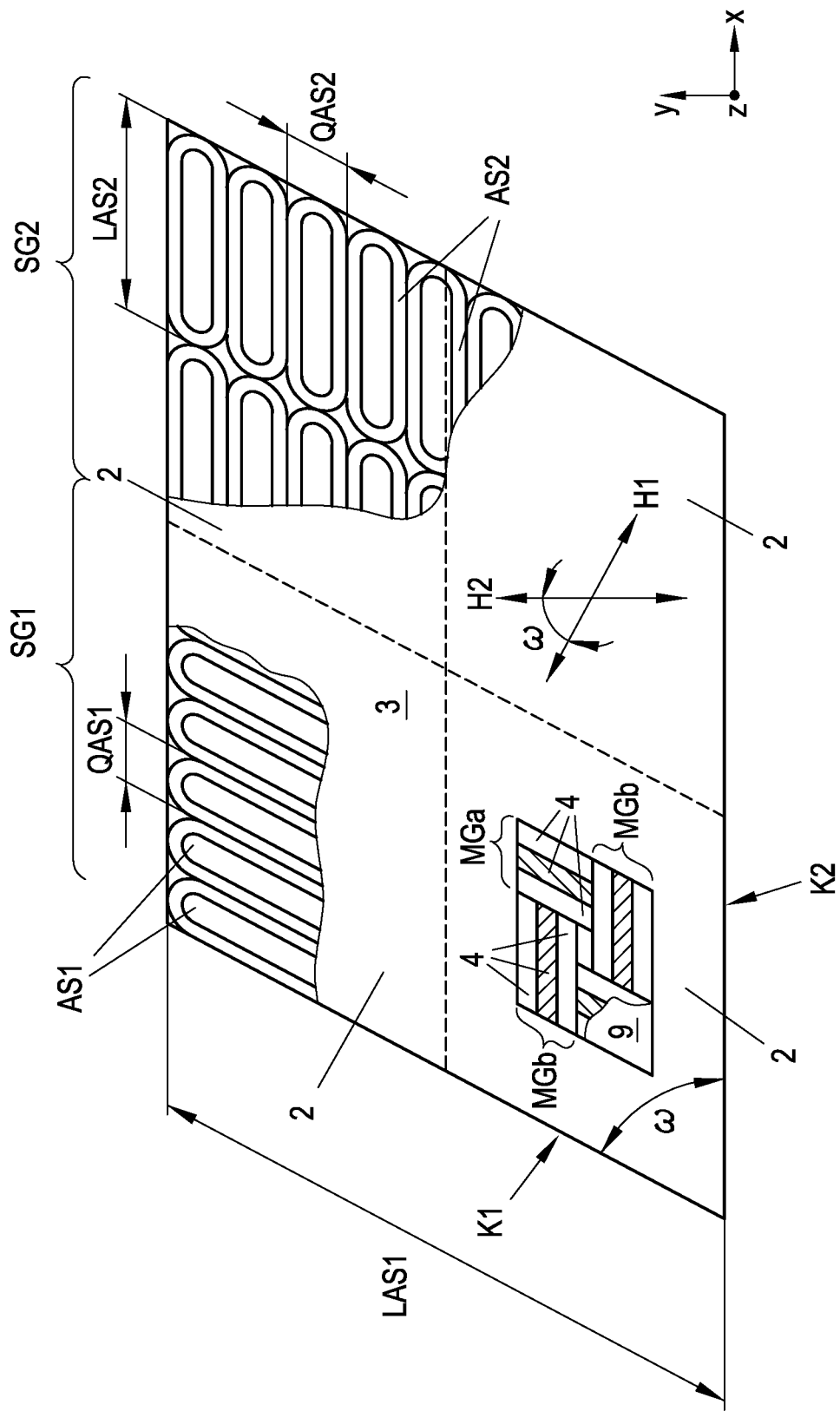
FIG. 10 is a plan view of a transport device in the form of a planar motor in an alternative embodiment.

FIG. 10 shows a further advantageous embodiment of the transport device 1 in a plan view of the transport plane 3. The transport device essentially corresponds to the embodiment according to FIG. 1a-1c and therefore only the essential differences are addressed at this point. The stator of the transport device 1 has a plurality of, in particular four, similar transport segments 2 which together form the transport plane 3 in which at least one transport unit TE is movable. However, in contrast to the embodiment according to FIG. 1a, the transport segments 2 are not designed to be rectangular, but each have the shape of a rhombus. In an analogous manner, the at least one transport unit TE is designed such that a surface of the transport unit TE projected onto the transport plane 3 is designed to be rhombic. Of course, the transport unit could also be designed to be rectangular, as has been described, e.g., with reference to FIG. 3a-4d. The first main movement direction H1 can, for example, be perpendicular to a first edge K1 of the rhombic transport plane 3 and the second main movement direction H2 can be perpendicular to the second edge K2 of the rhombic transport plane 3 adjoining the first edge K1. The transport segments 2 are each designed such that the first edge K1 and the second edge K2 are arranged at a rhombus angle ω<90° to one another in order to form the shape of a rhombus. Respective opposite sides run parallel, as shown in FIG. 10.

As already described in detail, the directions of the two main movement directions H1, H2 result from the arrangement of the drive coils AS1, AS2 of the coil groups SG1, SG2. Analogous to the example according to FIG. 1a, the drive coils AS1, AS2 of the first and second coil groups SG1, SG2 in the example shown are each designed as elongated coils with a longitudinal extension LAS1, LAS2 and a transverse extension QAS1, QAS2 perpendicular and relatively smaller thereto. In order to achieve different coil properties influencing the magnetic field, the drive coils AS1 of the first coil group SG1 can be closer to the transport plane 3 in the normal direction to the transport plane 3 (in this case in the Z-direction) than the drive coils AS2 of the second coil group SG2. The first main movement direction H1 thus runs orthogonally to the longitudinal extension LAS1 of the first drive coils AS1, in this case normal to the first edge K1 of the transport segments 2. The second main movement direction H2 runs orthogonally to the longitudinal extension LAS2 of the second drive coils AS2, in this case normal to the second edge K2 of the transport segments 2. In the example shown, the second main movement direction H2 consequently runs at a rhombus angle ω to the first main movement direction H1. The rhombus shape can advantageously be provided for the case when a desired angle between the main movement directions H1, H2 is less than 90°. This would be equally possible with a rectangular shape of the transport segment 2 (e.g., according to FIG. 1a) but for this purpose, the drive coils AS1, AS2 of at least one main movement direction H1, H2 would have to be arranged such that their longitudinal extension no longer runs parallel to the edge of the rectangular transport plane 3, which would be structurally more complex.

First magnet groups MGa and second magnet groups MGb, each with a plurality of drive magnets 4 of different magnetic orientation, are once again arranged on the transport unit TE. The drive magnets 4 can be arranged as shown in FIG. 10 in the form of a 1D arrangement with a plurality of elongated drive magnets 4 (see also FIG. 3a-3f). Of course, a 2D arrangement with a chessboard-like arrangement of drive magnets 4 would also be possible (see, e.g., FIG. 4a-4d). The 1D and 2D arrangement has already been described in detail and therefore no further details are provided at this point. In the example according to FIG. 10, the first magnet groups MGa are preferably arranged such that the longitudinal direction of the drive magnets 4 of the first magnet group MGa runs as normal as possible to the first main movement direction H1. Analogously, the second magnet groups MGb are preferably arranged such that the longitudinal direction of the drive magnets 4 of the second magnet groups MGb runs as normal as possible to the second main movement direction H2. Of course, the movement of the transport unit TE, in particular due to a rotation of the transport unit TE about the vertical axis (in this case the Z-axis), can in turn result in deviations which, e.g., can lead to a reduction in the efficiencies μH1, μH2 of the two main movement directions H1, H2, as has already been described with reference to FIG. 5e. However, if the magnet groups MGa, MGb have the same magnetic properties influencing the magnetic field, the assignment of the two main movement directions H1, H2 does not change. The arrangement according to the invention of the transport segments 2 relative to a predefined movement path BP, which has already been described in detail, naturally also applies to the embodiment according to FIG. 10 and therefore a detailed description is not provided at this point.

The invention claimed is:

1. Transport device in the form of a planar motor, the transport device comprising:
    a transport segment forming a transport plane;
    a transport unit configured and arranged to be movable in the transport plane in at least two-dimensions associated with two main movement directions
    a first coil group which defines the first main movement direction and has drive coils arranged on the transport segment;
    a second coil group which defines the second main movement direction and has drive coils arranged on the transport segment;
    drive magnets arranged on the transport unit,
    a control unit configured and arranged to
        control the drive coils of the first coil group in order to interact electromagnetically with at least some of the drive magnets of the transport unit for moving the transport unit in the first main movement direction, and
        control the drive coils of the second coil group in order to interact electromagnetically with at least some of the drive magnets of the transport unit for moving the transport unit in the second main movement direction;
    wherein the transport unit is configured and arranged to be movable in the two main movement directions with a different efficiency and/or a different maximum force and/or a different accuracy, in that the drive coils of the first and second coil groups have different coil properties influencing a magnetic field and/or the drive magnets of the transport unit interacting with the drive coils of the first coil group have different magnetic properties influencing the magnetic field than the drive magnets interacting with the drive coils of the second coil group,
    wherein the transport segment is oriented relative to a movement path which is predefined for the transport unit and runs between a defined starting point and a defined end point such that the movement path lies on the transport plane in such a manner that a first movement path ratio of the first main movement direction at a movement path length of the movement path is greater than or equal to a second movement path ratio of the second main movement direction at the movement path length.

2. The transport device according to claim 1, wherein the main movement directions are perpendicular to one another.

3. The transport device according to claim 1, wherein the transport segment forms a rhombic transport plane.

4. The transport device according to claim 1, wherein the transport segment includes a plurality of transport segment comprises a plurality of transport segments which form the transport plane of the transport device, wherein at least two transport segments of the plurality of transport segments are adjacent to one another,
wherein the movement path extends over multiple transport segments of the plurality of transport segments, and wherein the first main movement direction of a first transport segment of the plurality of transport segments runs parallel to the first or second main movement direction of an adjacent second transport segment of the plurality of transport segments.

5. The transport device according to claim 1, wherein the transport segment is oriented relative to the movement path such that the first movement path ratio is at a maximum.

6. The transport device according to claim 1, further including a process station configured and arranged for carrying out a work process on the transport unit,
wherein, in a region of the process station, a process movement path is determined as part of the movement path, along which the transport unit is configured and arranged to move in the transport plane,
wherein the transport segment and the process station are oriented relative to one another such that a first process movement path ratio of the main movement direction at a process movement path length of the process movement path is greater than or equal to a second process movement path ratio of the second main movement direction at the process movement path.

7. The transport according to claim 1, further including a plurality of process stations in the transport device, each of the plurality of process stations configured and arranged for carrying out a work process on the transport unit,
wherein, in a region of the process stations, a process movement path is determined as part of the movement path, along which the transport unit is configured and arranged to move in the transport plane,
wherein the transport segment and the plurality of process stations are oriented relative to one another such that a first process movement path ratio of the first main movement direction with respect to a sum of the process movement paths lengths of the process movement paths is greater than or equal to a second process movement path ratio of the second main movement direction with respect to the sum of the process movement path lengths.

8. The transport device according to claim 1, further including at least two process stations in the transport device, each of the at least two process stations configured and arranged for carrying out a work process on the transport unit,
wherein, in the region between the process stations, a transition path is defined as part of the movement path, along which the transport unit is configured and arranged to move in the transport plane,
wherein a first transition path proportion of the first main movement direction at a transition path length of the transition path is greater than or equal to a second transition path proportion of the second main movement direction at the transition path length of the transition path.

9. The transport device according to claim 1, wherein an average coil spacing of the drive coils of the first and second coil groups in the normal direction from the drive magnets of the transport unit and/or a conductor resistance of the drive coils of the first and second coil groups and/or a maximum coil current of the drive coils of the first and second coil groups and/or a number of windings of the drive coils of the first and second coil groups and/or a coil geometry of the drive coils are the coil properties influencing the magnetic field; and/or
a remanent flux density of the drive magnets and/or a relative orientation between the drive magnets and the drive coils of the first and second coil groups and/or a pole pitch of the drive magnets and/or a magnetic geometry of the drive magnets are the magnetic properties of the drive magnets of the transport unit influencing the magnetic field.

10. The transport device according to claim 1, wherein the control unit is configured and arranged to
control the drive coils of the first coil group, which interact with the drive magnets of the transport unit, in order to generate a first levitation force component of a levitation force acting on the transport unit and opposing gravitation, and
control the drive coils of the second coil group, which interact with the drive magnets of the transport unit, in order to generate a second levitation force component in the levitation force complementary to the first levitation force component, wherein the levitation force component of the drive coils of the main movement direction, which has the higher efficiency, is larger.

11. The transport device according to claim 10, wherein the levitation force components are determined as a function of the efficiencies of the main movement directions or as a function of at least one coil property of the drive coils of the main movement directions influencing the magnetic field and/or at least one magnetic property of the drive magnets of the main movement directions influencing the magnetic field.

12. The transport device according to claim 10, wherein levitation force components are determined during the movement of the transport unit as a function of a movement variable of the transport.

13. Method for operating a transport device in the form of a planar motor, the method including the following steps:
providing a transport segment, forming a transport plane of the planar motor;
providing a transport unit which is moved in the transport plane at least two-dimensionally in two main movement directions;
arranging a first coil group on the transport segment where the first coil group defines a first main movement direction of the two main movement directions and has a first plurality of drive coils;
arranging a second coil group on the transport segment, which second coil group defines a second main movement direction of the two main movement directions and has a second plurality of drive coils;
arranging drive magnets on the transport unit,
wherein the first plurality of drive coils of the first coil group interact electromagnetically with at least part of the drive magnets of the transport unit for moving the transport unit in the first main movement direction;

wherein the second plurality of drive coils of the second coil group interact electromagnetically with at least part of the drive magnets of the transport unit for moving the transport unit in the second main movement direction;

moving the transport unit in the two main movement directions with a different efficiency and/or a different maximum force and/or a different accuracy by providing the first and second plurality of drive coils of the first and second coil group with different coil properties influencing the magnetic field and/or by providing the drive magnets of the transport unit interacting with the first plurality of drive coils of the first coil group with different magnetic properties influencing the magnetic field than for the drive magnets interacting with the second plurality of drive coils of the second coil group; and orient the transport segment relative to a movement path which is predefined for the transport unit and runs between a defined starting point and a defined end point such that the transport unit is moved along the movement path in the transport plane and that a first movement path ratio of the first main movement direction at a movement path length of the movement path is greater than or equal to a second movement path ratio of the second main movement direction at the movement path length.

14. The method according to claim 13, wherein the transport unit is moved in the region of a process station of the transport device along a process movement path forming part of the movement path in order to carry out a work process on the transport unit, wherein the transport segment and the process station are oriented relative to one another such that a first process movement path ratio of the main movement direction at a process movement path length of the process movement path is greater than or equal to a second process movement path ratio of the second main movement direction at the process movement path length.

15. The method according to claim 13, wherein the transport unit is moved in a plurality of process stations of the transport device along a process movement path in each case, the process movement path forming part of the movement path in order to carry out a work process on the transport unit, wherein the transport segment and the process stations are oriented relative to one another such that a first process movement path ratio of the first main movement direction with respect to a sum ($\Sigma$) of process movement path lengths of the process movement paths, is greater than or equal to a second process movement path ratio of the second main movement direction with respect to the sum of the process movement path lengths.

16. The method according to claim 13, wherein the transport unit is moved between two process stations, in which a respective work process is carried out on the transport unit, along a transition path forming part of the movement path, wherein a first transition path proportion of the first main movement direction at a transition path length of the transition path is greater than or equal to a second transition path proportion of the second main movement direction at the transition path length.

17. The method according to claim 13, wherein the first plurality of drive coils of the first coil group interact with the drive magnets of the transport unit to generate a first levitation force component of a levitation force that acts on the transport unit and opposes gravitation, and the second plurality of drive coils of the second coil group interact with the drive magnets of the transport unit to generate a second levitation force component of the levitation force complementary to the first levitation force component, wherein the first plurality of drive coils of the first main movement direction with the greater efficiency generate a larger levitation force component.

18. The method according to claim 17, wherein the levitation force components are determined as a function of the efficiencies of the main movement directions or as a function of at least one coil property of the first and second plurality of drive coils influencing the magnetic field and/or at least one magnetic property of the drive magnets (4) influencing the magnetic field.

19. The method according to claim 17, wherein the levitation force components are determined during the movement of the transport unit as a function of a movement variable of the transport unit.

* * * * *